(12) United States Patent
Tajima

(10) Patent No.: US 11,831,249 B2
(45) Date of Patent: Nov. 28, 2023

(54) POWER CONVERSION APPARATUS

(71) Applicant: TOSHIBA MITSUBISHI-ELECTRIC INDUSTRIAL SYSTEMS CORPORATION, Chuo-ku (JP)

(72) Inventor: Hidenobu Tajima, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 261 days.

(21) Appl. No.: 17/428,423

(22) PCT Filed: Nov. 6, 2019

(86) PCT No.: PCT/JP2019/043447
§ 371 (c)(1),
(2) Date: Aug. 4, 2021

(87) PCT Pub. No.: WO2021/090393
PCT Pub. Date: May 14, 2021

(65) Prior Publication Data
US 2022/0140747 A1    May 5, 2022

(51) Int. Cl.
*H02M 7/537* (2006.01)
*H02M 1/088* (2006.01)

(52) U.S. Cl.
CPC .......... *H02M 7/537* (2013.01); *H02M 1/088* (2013.01)

(58) Field of Classification Search
CPC .. H02M 7/537; H02M 7/5387; H02M 7/5395; H02M 1/088; H02M 1/0048; Y02B 70/10
See application file for complete search history.

(56) References Cited

U.S. PATENT DOCUMENTS

| | | | |
|---|---|---|---|
| 2016/0233783 A1* | 8/2016 | Uemura | H02M 1/32 |
| 2017/0302105 A1 | 10/2017 | Toyoda et al. | |
| 2018/0013352 A1* | 1/2018 | Cao | H02M 3/33515 |

FOREIGN PATENT DOCUMENTS

| | | |
|---|---|---|
| JP | 2010-220303 A | 9/2010 |
| JP | 2020-191725 A | 11/2020 |
| WO | WO 2012/046521 A1 | 4/2012 |
| WO | 2017/179095 A1 | 10/2017 |

OTHER PUBLICATIONS

Indian Office Action dated Jun. 20, 2022 in Indian Patent Application No. 202117038520, 6 pages.
International Search Report dated Feb. 10, 2020 in PCT/JP2019/043447 filed on Nov. 6, 2019, 2 pages.
Hearing Notice dated Aug. 24, 2023 in counterpart Indian Application No. 202117038520.

* cited by examiner

*Primary Examiner* — Jeffrey M Shin
(74) *Attorney, Agent, or Firm* — Oblon, McClelland, Maier & Neustadt, L.L.P.

(57) ABSTRACT

A gate drive circuit of an uninterruptible power supply apparatus generates first and second gate drive signals in response to first and second PWM signals, and alternately turns on first and second IGBTs. When the first IGBT is on, the gate drive circuit sets the first gate drive signal to the "L" level in response to the second PWM signal and sets the second gale drive signal to the "H" level in response to a voltage across terminals of the first IGBT exceeding a threshold voltage.

11 Claims, 19 Drawing Sheets

POWER CONVERSION APPARATUS

TECHNICAL FIELD

This invention relates to a power conversion apparatus and particularly to a power conversion apparatus including first and second switching elements that are alternately turned on.

BACKGROUND ART

For example, WO2012/046521 (PTL 1) discloses a power conversion apparatus including first and second switching elements and a control device that generates first and second control signals and alternately turns on the first and second switching elements. When the first switching element is on, the control device sets the first control signal to a deactivated level to turn off the first switching element, and after a certain deadtime elapses, the control device sets the second control signal to an activated level to turn on the second switching element.

CITATION LIST

Patent Literature

PTL 1: WO2012/046521

SUMMARY OF INVENTION

Technical Problem

In PTL 1, the deadtime is fixed to a constant value. An off delay time period from setting of the first control signal to the deactivated level until the first switching element is actually set to an off state, however, becomes shorter in inverse proportion to a current (interrupting current) that flows through the first switching element while the first control signal is at the activated level.

Therefore, depending on a value of the interrupting current, the deadtime may become shorter than the actual off delay time period, and the second switching element may be turned on before the first switching element is set to the off state and an overcurrent may flow through the first and second switching elements.

In order to address this, a method of setting a deadtime sufficiently longer than the off delay time period may be performed. When the deadtime is extended, however, a duration of on of the second switching element becomes shorter and efficiency becomes poorer.

Therefore, a primary object of this invention is to provide a power conversion apparatus capable of preventing an overcurrent from flowing and achieving improved efficiency.

Solution to Problem

A power conversion apparatus according to this invention includes a first direct-current (DC) terminal that receives a first DC voltage, an alternating-current (AC) terminal that receives an AC voltage, a second DC terminal that receives a second DC voltage different from the first DC voltage, a first switching element connected between the first DC terminal and the AC terminal, a second switching element connected between the AC terminal and the second DC terminal, a first control circuit that alternately provides first and second control signals, and a first drive circuit that generates first and second drive signals in response to an output signal from the first control circuit and alternately turns on the first and second switching elements. When the first and second drive signals are set to an activated level, the first and second switching elements are turned on, respectively. When the first and second drive signals are set to a deactivated level, the first and second switching elements are turned off, respectively. When the first switching element is on, the first drive circuit sets the first drive signal to the deactivated level in response to the second control signal and sets the second drive signal to the activated level in response to a voltage across terminals of the first switching element exceeding a first threshold voltage. When the second switching element is on, the first drive circuit sets the second drive signal to the deactivated level in response to the first control signal and sets the first drive signal to the activated level in response to a voltage across terminals of the second switching element exceeding a second threshold voltage.

Advantageous Effects of Invention

In the power conversion apparatus according to this invention, the first control circuit that alternately provides the first and second control signals and the first drive circuit that generates the first and second drive signals in response to an output signal from the first control circuit and alternately turns on the first and second switching elements are provided. When the first switching element is on, the first drive circuit sets the first drive signal to the deactivated level in response to the second control signal and sets the second drive signal to the activated level in response to a voltage across terminals of the first switching element exceeding the first threshold voltage. Therefore, since the second switching element is turned on after the first switching element is actually turned off, an overcurrent can be prevented from flowing and efficiency can be improved.

DESCRIPTION OF EMBODIMENTS

First Embodiment

Figure 1:
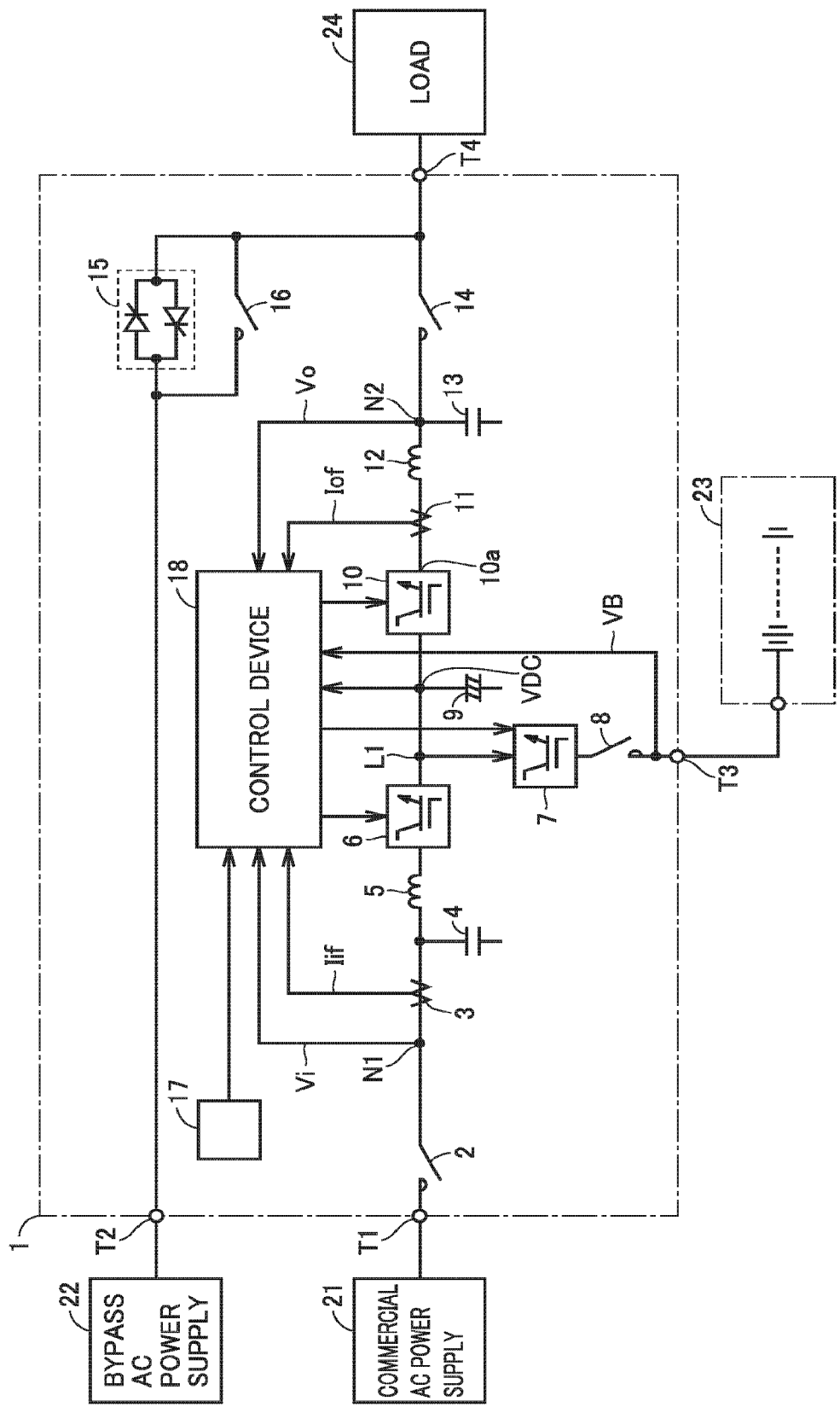
FIG. 1 is a circuit block diagram showing a configuration of an uninterruptible power supply apparatus according to a first embodiment of this invention.

FIG. 1 is a circuit block diagram showing a configuration of an uninterruptible power supply apparatus 1 according to a first embodiment of this invention. Uninterruptible power supply apparatus 1 once converts three-phase AC power from a commercial AC power supply 21 to DC power, and converts DC power to three-phase AC power and supplies three-phase AC power to a load 24. FIG. 1 shows only a circuit in a portion corresponding to one phase (for example, the U phase) of three phases (the U phase, the V phase, and the W phase) for the sake of brevity of the drawings and description.

In FIG. 1, uninterruptible power supply apparatus 1 includes an AC input terminal T1, a bypass input terminal T2, a battery terminal T3, and an AC output terminal T4. AC input terminal T1 receives AC power at a commercial frequency from commercial AC power supply 21. Bypass input terminal T2 receives AC power at the commercial frequency from a bypass AC power supply 22. Bypass AC power supply 22 may be a commercial AC power supply or a generator.

Battery terminal T3 is connected to a battery (power storage device) 23. Battery 23 stores DC power. A capacitor instead of battery 23 may be connected. AC output terminal T4 is connected to load 24. Load 24 is driven with AC power.

Uninterruptible power supply apparatus 1 further includes electromagnetic contactors 2, 8, 14, and 16, current detectors 3 and 11, capacitors 4, 9, and 13, reactors 5 and 12, a converter 6, a bidirectional chopper 7, an inverter 10, a semiconductor switch 15, an operation portion 17, and a control device 18.

Electromagnetic contactor 2 and reactor 5 are connected in series between AC input terminal T1 and an input node of converter 6. Capacitor 4 is connected to a node N1 between electromagnetic contactor 2 and reactor 5. Electromagnetic contactor 2 is turned on when uninterruptible power supply apparatus 1 is used, and turned off, for example, when uninterruptible power supply apparatus 1 is maintained.

An instantaneous value of an AC input voltage Vi that appears at node N1 is detected by control device 18. Whether or not a power failure has occurred is determined based on the instantaneous value of AC input voltage Vi. Current detector 3 detects an AC input current Ii that flows through node N1 and provides a signal Iif indicating a detection value to control device 18.

Capacitor 4 and reactor 5 implement a low-pass filter, and allows passage of AC power at the commercial frequency from commercial AC power supply 21 to converter 6 and prevents a signal at a switching frequency generated in converter 6 from passing to commercial AC power supply 21.

Converter 6 is controlled by control device 18. During a normal operation in which AC power is supplied from commercial AC power supply 21, converter 6 converts AC power to DC power and provides DC power to a DC line L1. During a power failure in which supply of AC power from commercial AC power supply 21 is suspended, operation by converter 6 is stopped. An output voltage from converter 6 is controllable to a desired value. Capacitor 4, reactor 5, and converter 6 implement a converter module.

Capacitor 9 is connected to DC line L1 and smoothens a voltage on DC line L1. An instantaneous value of a DC voltage VDC that appears on DC line L1 is detected by control device 18. DC line L1 is connected to a high-voltage side node of bidirectional chopper 7 and bidirectional chopper 7 has a low-voltage side node connected to battery terminal T3 with electromagnetic contactor 8 being interposed.

Electromagnetic contactor 8 is turned on while uninterruptible power supply apparatus 1 is used, and turned off, for example, while uninterruptible power supply apparatus 1 and battery 23 are maintained. An instantaneous value of a voltage VB across terminals of battery 23 that appears at battery terminal T3 is detected by control device 18.

Bidirectional chopper 7 is controlled by control device 18. During the normal operation in which AC power is supplied from commercial AC power supply 21, DC power generated by converter 6 is stored in battery 23, and during the power failure in which supply of AC power from commercial AC power supply 21 is suspended, DC power in battery 23 is supplied to inverter 10 through DC line L1.

When DC power is stored in battery 23, bidirectional chopper 7 down-converts DC voltage VDC on DC line L1 and provides the down-converted DC voltage to battery 23. When DC power in battery 23 is supplied to inverter 10, bidirectional chopper 7 up-converts voltage VB across terminals of battery 23 and provides the up-converted voltage to DC line L1. DC line L1 is connected to an input node of inverter 10.

Inverter 10 is controlled by control device 18 and converts DC power supplied from converter 6 or bidirectional chopper 7 through DC line L1 to AC power at the commercial frequency and provides AC power. In other words, during the normal operation, inverter 10 converts DC power supplied from converter 6 through DC line L1 to AC power, and during the power failure, inverter 10 converts DC power supplied from battery 23 through bidirectional chopper 7 to AC power. An output voltage from inverter 10 is controllable to a desired value.

Inverter 10 has an output node 10a connected to one terminal of reactor 12 and reactor 12 has the other terminal (a node N2) connected to AC output terminal T4 with electromagnetic contactor 14 being interposed. Capacitor 13 is connected to node N2.

Current detector 11 detects an instantaneous value of an output current Io from inverter 10 and provides a signal Iof indicating a detection value thereof to control device 18. An instantaneous value of an AC output voltage Vo that appears at node N2 is detected by control device 18.

Reactor 12 and capacitor 13 implement a low-pass filter that allows passage of AC power at the commercial frequency generated in inverter 10 to AC output terminal T4 and prevents a signal at a switching frequency generated in inverter 10 from passing to AC output terminal T4. Inverter 10, reactor 12, and capacitor 13 implement an inverter module.

Electromagnetic contactor 14 is controlled by control device 18. Electromagnetic contactor 14 is turned on in an inverter power feed mode in which AC power generated by inverter 10 is supplied to load 24, and turned off in a bypass power feed mode in which AC power from bypass AC power supply 22 is supplied to load 24.

Semiconductor switch 15 includes a thyristor and is connected between bypass input terminal T2 and AC output terminal T4. Electromagnetic contactor 16 is connected in parallel to semiconductor switch 15. Semiconductor switch 15 is controlled by control device 18. Semiconductor switch 15 is normally off, but turned on instantaneously when inverter 10 fails, so that AC power from bypass AC power supply 22 is supplied to load 24. Semiconductor switch 15 is turned off after lapse of a prescribed time period since it was turned on.

Electromagnetic contactor 16 is turned off in the inverter power feed mode in which AC power generated by inverter 10 is supplied to load 24, and turned on in the bypass power feed mode in which AC power from bypass AC power supply 22 is supplied to load 24.

Electromagnetic contactor 16 is turned on when inverter 10 fails, so that AC power from bypass AC power supply 22 is supplied to load 24. In other words, when inverter 10 fails, semiconductor switch 15 is instantaneously turned on for a prescribed time period and electromagnetic contactor 16 is turned on, in order to prevent overheating and break of semiconductor switch 15.

Operation portion 17 includes a plurality of buttons operated by a user of uninterruptible power supply apparatus 1 and an image display that shows various types of information. As the user operates operation portion 17, power of uninterruptible power supply apparatus 1 can be turned on and off or any one of the bypass power feed mode and the inverter power feed mode can be selected.

Control device 18 controls the entire uninterruptible power supply apparatus 1 based on a signal from operation portion 17, AC input voltage Vi, AC input current Ii, DC voltage VDC, battery voltage VB, AC output current Io, and AC output voltage Vo. In other words, control device 18 detects whether or not a power failure has occurred based on a detection value of AC input voltage Vi and controls converter 6 and inverter 10 in synchronization with a phase of AC input voltage Vi.

During the normal operation in which AC power is supplied from commercial AC power supply 21, control device 18 controls converter 6 such that DC voltage VDC attains to a desired reference voltage VDCr, and during the power failure in which supply of AC power from commercial AC power supply 21 is suspended, control device 18 stops the operation by converter 6.

Furthermore, during the normal operation, control device 18 controls bidirectional chopper 7 such that battery voltage VB attains to a desired reference voltage VBr, and during the power failure, control device 18 controls bidirectional chopper 7 such that DC voltage VDC attains to desired reference voltage VDCr.

An operation by uninterruptible power supply apparatus 1 will now be described. When the inverter power feed mode is selected during the normal operation in which AC power is supplied from commercial AC power supply 21, semiconductor switch 15 and electromagnetic contactor 16 are turned off and electromagnetic contactors 2, 8, and 14 are turned on.

AC power supplied from commercial AC power supply 21 is converted to DC power by converter 6. DC power generated by converter 6 is stored in battery 23 by means of bidirectional chopper 7 and supplied to inverter 10. Inverter 10 converts DC power supplied from converter 6 to AC power and supplies AC power to load 24. Load 24 is driven with AC power supplied from inverter 10.

As supply of AC power from commercial AC power supply 21 stops, that is, when the power failure occurs, operation by converter 6 is stopped and DC power in battery 23 is supplied to inverter 10 by means of bidirectional chopper 7. Inverter 10 converts DC power from bidirectional chopper 7 to AC power and supplies AC power to load 24. Therefore, for a period during which DC power is stored in battery 23, operation by load 24 can continue.

When inverter 10 fails in the inverter power feed mode, semiconductor switch 15 is instantaneously turned on, electromagnetic contactor 14 is turned off, and electromagnetic contactor 16 is turned on. AC power from bypass AC power supply 22 is thus supplied to load 24 through semiconductor switch 15 and electromagnetic contactor 16 and load 24 continues operating. After a certain time period, semiconductor switch 15 is turned off, so that overheating and break of semiconductor switch 15 is prevented.

Figure 2:
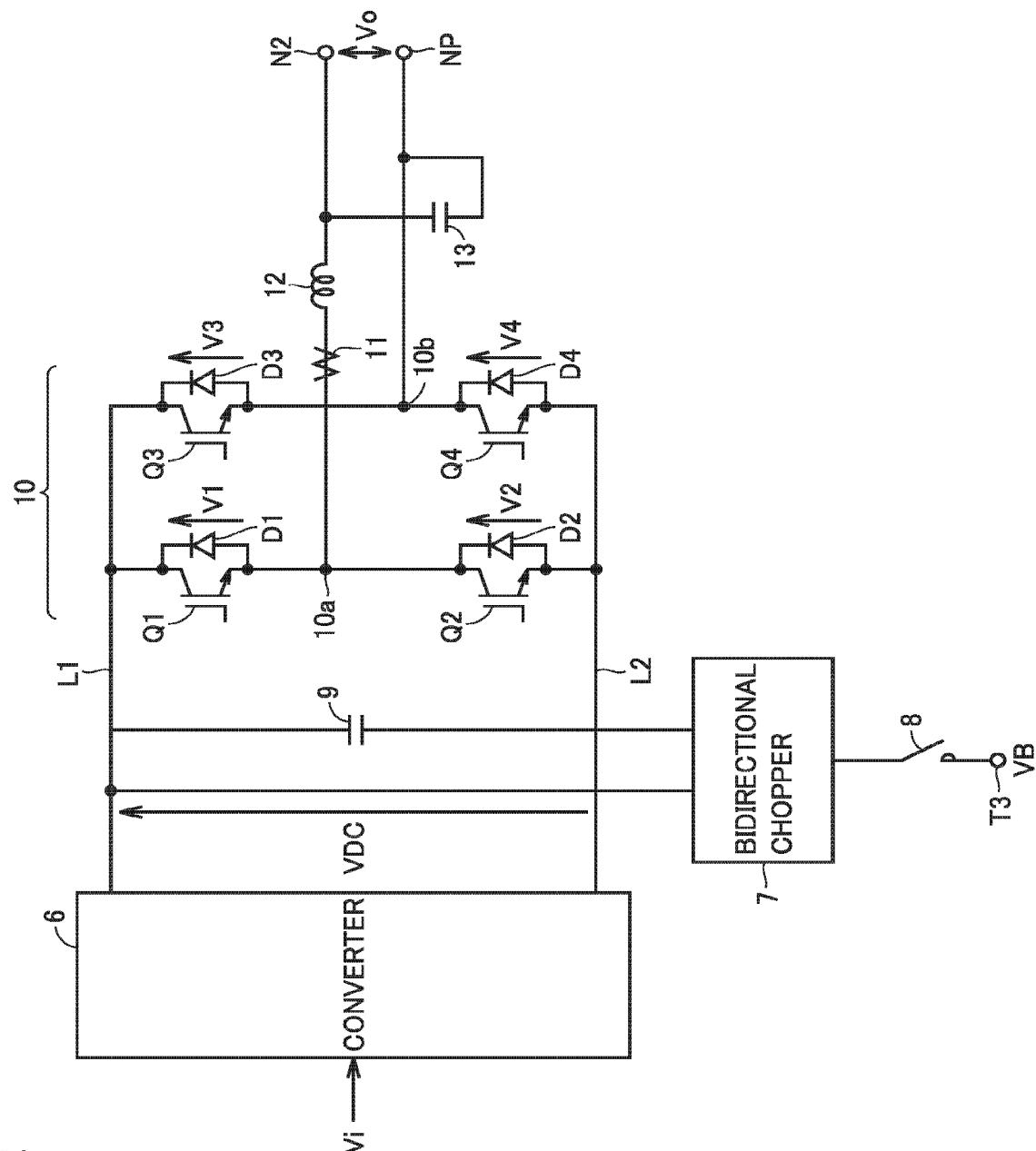
FIG. 2 is a circuit block diagram showing a configuration of an inverter shown in FIG. 1 and a peripheral portion thereof.

FIG. 2 is a circuit block diagram showing a configuration of inverter 10 shown in FIG. 1 and a peripheral portion thereof. In FIG. 2, a positive-side DC line L1 and a negative-side DC line L2 are connected between converter 6 and inverter 10. Capacitor 9 is connected between DC lines L1 and L2.

During the normal operation in which AC power is supplied from commercial AC power supply 21, converter 6 converts AC input voltage Vi from commercial AC power supply 21 to DC voltage VDC and provides the DC voltage between DC lines L1 and L2. During the power failure in which supply of AC power from commercial AC power supply 21 is suspended, operation by converter 6 is stopped and bidirectional chopper 7 up-converts battery voltage VB and provides DC voltage VDC between DC lines L1 and L2.

Inverter 10 includes insulated gate bipolar transistors (IGBTs) Q1 to Q4 and diodes D1 to D4. IGBTs Q1 and Q2 implement first and second switching elements, respectively. IGBTs Q1 and Q3 have collectors connected to DC line L1 (a first DC terminal) together and have respective emitters connected to output nodes (AC terminals) 10a and 10b.

IGBTs Q2 and Q4 have respective collectors connected to output nodes 10a and 10b and have emitters connected to DC line L2 (a second DC terminal) together. Diodes D1 to D4 are connected in anti-parallel to IGBTs Q1 to Q4, respectively. Inverter 10 has output node 10a connected to node N2 with reactor 12 (FIG. 1) being interposed and has output node 10b connected to a neutral point NP. Capacitor 13 is connected between a node N2 and neutral point NP.

IGBTs Q1 and Q4 and IGBTs Q2 and Q3 are alternately turned on. When IGBTs Q1 and Q4 are turned on and IGBTs Q2 and Q3 are turned off, a positive-side terminal (DC line L1) of capacitor 9 is connected to output node 10a with IGBT Q1 being interposed, output node 10b is connected to a negative-side terminal (DC line L2) of capacitor 9 with IGBT Q4 being interposed, and a voltage across terminals of capacitor 9 is provided between output nodes 10a and 10b. In other words, a positive DC voltage is provided between output nodes 10a and 10b.

When IGBTs Q2 and Q3 are turned on and IGBTs Q1 and Q4 are turned off, the positive-side terminal (DC line L1) of capacitor 9 is connected to output node 10b with IGBT Q3 being interposed, output node 10a is connected to the negative-side terminal (DC line L2) of capacitor 9 with IGBT Q2 being interposed, and a voltage across terminals of capacitor 9 is provided between output nodes 10b and 10a. In other words, a negative DC voltage is provided between output nodes 10a and 10b.

A problem of inverter 10 will now be described. As described above, IGBT Q1 and IGBT Q2 are alternately turned on. In switching from a state that IGBT Q1 is on to a state that IGBT Q2 is on, when IGBT Q2 is turned on before IGBT Q1 is set to the off state, an overcurrent flows from the positive-side terminal (DC line L1) of capacitor 9 through IGBTs Q1 and Q2 to the negative-side terminal (DC line L2) of capacitor 9 and IGBTs Q1 and Q2 break.

In contrast, in switching from the state that IGBT Q2 is on to the state that IGBT Q1 is on, when IGBT Q1 is turned on before IGBT Q2 is set to the off state, an overcurrent flows from the positive-side terminal (DC line L1) of capacitor 9 through IGBTs Q1 and Q2 to the negative-side terminal (DC line L2) of capacitor 9 and IGBTs Q1 and Q2 break. IGBTs Q4 and Q3 also suffer from the problem the same as in IGBTs Q1 and Q2. The present first embodiment solves this problem.

Figure 3:
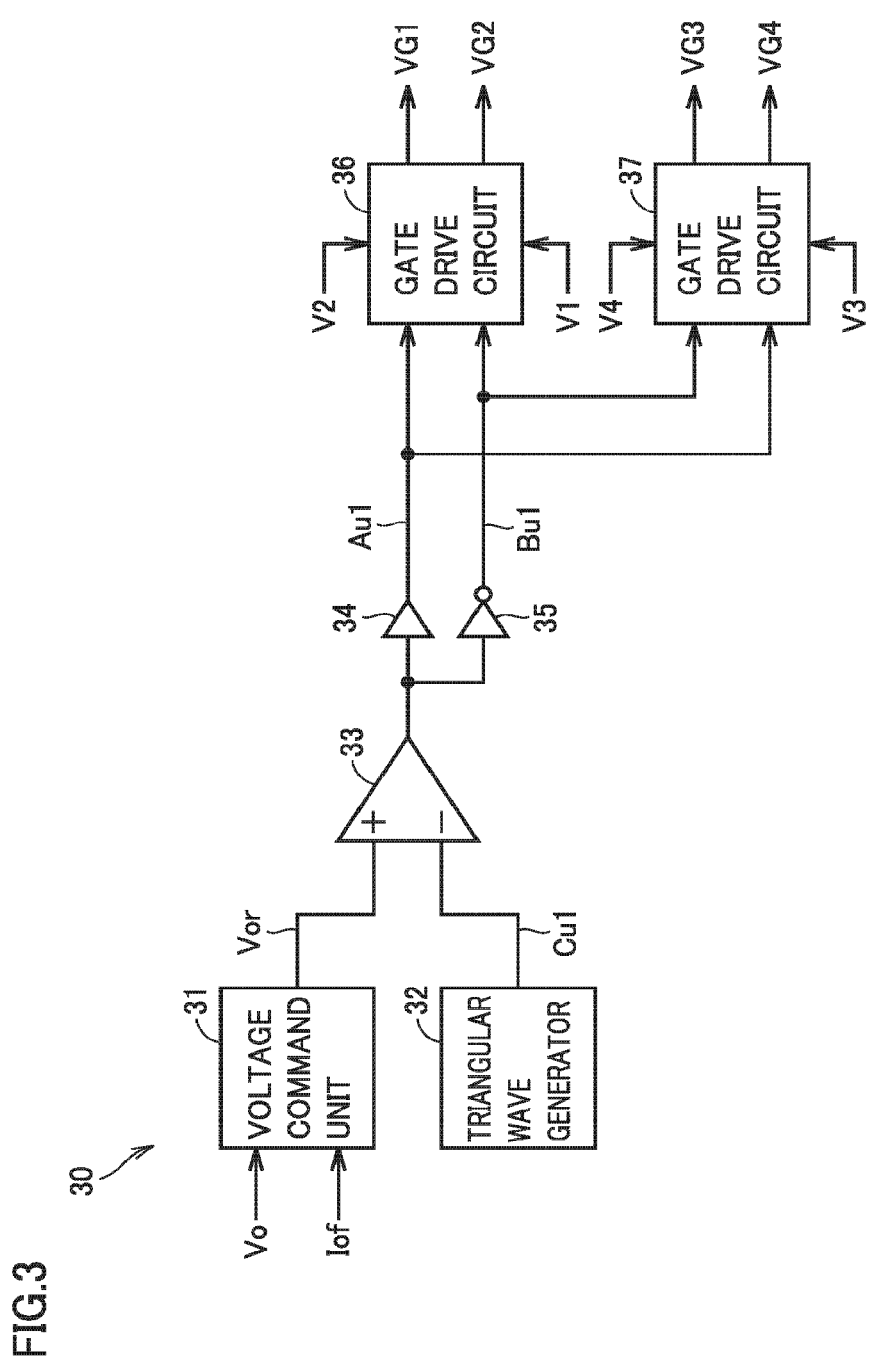
FIG. 3 is a circuit block diagram showing a configuration of an inverter controller that controls the inverter shown in FIG. 2.

FIG. 3 is a circuit block diagram showing a configuration of an inverter controller 30 that controls inverter 10 shown in FIG. 1. Inverter controller 30 is included in control device 18. In FIG. 3, inverter controller 30 includes a voltage command unit 31, a triangular wave generator 32, a comparator 33, a buffer 34, an inverter 35, and gate drive circuits 36 and 37.

Voltage command unit 31 generates a sinusoidal voltage command value Vor based on an instantaneous value of AC output voltage Vo that appears at node N2 (FIG. 1) and output signal Iof from current detector 11 (FIG. 1). Voltage command value V or is in phase with AC input voltage Vi of a corresponding phase (the U phase here) of the three phases (the U phase, the V phase, and the W phase).

Triangular wave generator 32 provides a triangular wave signal Cu1 at a frequency fH (for example, 20 KHz) sufficiently higher than the commercial frequency (for example, 60 Hz). Comparator 33 compares magnitude between voltage command value Vor from voltage command unit 31 and triangular wave signal Cu1 from triangular wave generator 32 and provides a PWM signal Au1 indicating a result of comparison. Buffer 34 provides PWM signal Au1 to gate drive circuits 36 and 37. Inverter 35 inverts PWM signal Au1 to generate a PWM signal Bu1 and provides PWM signal Bu1 to gate drive circuits 36 and 37.

Figure 4:
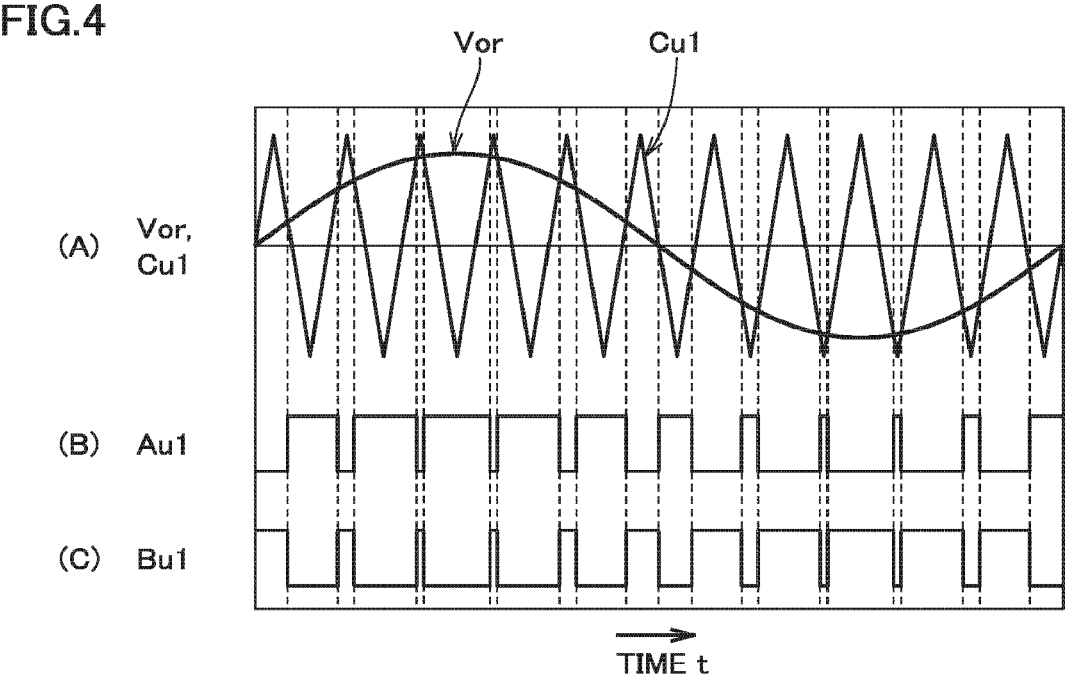
FIG. 4 is a time chart showing waveforms of a voltage command value, a triangular wave signal, and a PWM signal shown in FIG. 3.

FIGS. 4 (A), (B), and (C) is a time chart showing waveforms of voltage command value Vor, triangular wave signal Cu1, and PWM signals Au1 and Bu1 shown in FIG. 3. As shown in FIG. 4 (A), voltage command value Vor is a sinusoidal signal at the commercial frequency. The frequency of triangular wave signal Cu1 is higher than the frequency (commercial frequency) of voltage command value Vor. A positive-side peak value of triangular wave signal Cu1 is larger than a positive-side peak value of voltage command value Vor. A negative-side peak value of triangular wave signal Cu1 is smaller than a negative-side peak value of voltage command value Vor.

When the level of triangular wave signal Cu1 is higher than voltage command value Vor as shown in FIGS. 4 (A) and (B), PWM signal Au1 is set to the "L" level, and when the level of triangular wave signal Cu1 is lower than voltage command value Vor, PWM signal Au1 is set to the "H" level. PWM signal Au1 becomes a positive pulse signal train.

While voltage command value Vor has a positive polarity, a pulse width of PWM signal Au1 increases with increase in voltage command value Vor. While voltage command value Vor has a negative polarity, the pulse width of PWM signal Au1 decreases with decrease in voltage command value Vor. As shown in FIGS. 4 (B) and (C), PWM signal Bu1 is an inverted signal of PWM signal Au1.

With PWM signal Au1 set to the "H" level being defined as the first control signal and with PWM signal Bu1 set to the "H" level being defined as the second control signal, the first and second control signals are alternately provided as shown in FIGS. 4 (B) and (C). Voltage command unit 31, triangular wave generator 32, comparator 33, buffer 34, and inverter 35 implement the first control circuit that alternately provides the first and second control signals.

Referring back to FIG. 3, gate drive circuit 36 generates gate drive signals VG1 and VG2 for turning on and off IGBTs Q1 and Q2 based on PWM signals Au1 and Bu1 and collector-emitter voltages V1 and V2 of IGBTs Q1 and Q2.

When gate drive signal VG1 is set to the "H" level which is the activated level, IGBT Q1 is turned on. When IGBT Q1 is turned on, collector-emitter voltage V1 of IGBT Q1 attains to a minimum value V1L. When gate drive signal VG1 is set to the "L" level which is the deactivated level, IGBT Q1 is turned off. When IGBT Q1 is turned off, collector-emitter voltage V1 of IGBT Q1 attains to a maximum value V1H. A prescribed threshold voltage VTH1 is set between V1L and V1H.

When gate drive signal VG2 is set to the "H" level which is the activated level, IGBT Q2 is turned on. When IGBT Q2 is turned on, collector-emitter voltage V2 of IGBT Q2 attains to a minimum value V2L. When gate drive signal VG2 is set to the "L" level which is the deactivated level, IGBT Q2 is turned off. When IGBT Q2 is turned off, collector-emitter voltage V2 of IGBT Q2 attains to a maximum value V2H. A prescribed threshold voltage VTH2 is set between V2L and V2H.

When PWM signal Au1 falls from the "H" level to the "L" level and PWM signal Bu1 rises from the "L" level to the "H" level while IGBT Q1 is on, gate drive circuit 36 sets gate drive signal VG1 to the "L" level which is the deactivated level, compares magnitude between collector-emitter voltage V1 of IGBT Q1 and threshold voltage VTH1, determines IGBT Q1 as being set to the off state when V1 exceeds VTH1, and sets gate drive signal VG2 to the "H" level which is the activated level to turn on IGBT Q2.

When PWM signal Au1 rises from the "L" level to the "H" level and PWM signal Bu1 falls from the "H" level to the "L" level while IGBT Q2 is on, gate drive circuit 36 sets gate drive signal VG2 to the "L" level which is the deactivated level, compares magnitude between collector-emitter voltage V2 of IGBT Q2 and threshold voltage VTH2, determines IGBT Q2 as being set to the off state when V2 exceeds VTH2, and sets gate drive signal VG1 to the "H" level which is the activated level to turn on IGBT Q1.

Gate drive circuit 37 generates gate drive signals VG3 and VG4 for turning on and off IGBTs Q3 and Q4 based on PWM signals Au1 and Bu1 and collector-emitter voltages V3 and V4 of IGBTs Q3 and Q4.

When gate drive signal VG3 is set to the "H" level which is the activated level, IGBT Q3 is turned on. When IGBT Q3 is turned on, collector-emitter voltage V3 of IGBT Q3 attains to a minimum value V3L. When gate drive signal VG3 is set to the "L" level which is the deactivated level, IGBT Q3 is turned off. When IGBT Q3 is turned off, collector-emitter voltage V3 of IGBT Q3 attains to a maximum value V3H. A prescribed threshold voltage VTH3 is set between V3L and V3H.

When gate drive signal VG4 is set to the "H" level which is the activated level, IGBT Q4 is turned on. When IGBT Q4 is turned on, collector-emitter voltage V4 of IGBT Q4 attains to a minimum value V4L. When gate drive signal VG4 is set to the "L" level which is the deactivated level, IGBT Q4 is turned off. When IGBT Q4 is turned off, collector-emitter voltage V4 of IGBT Q4 attains to a maximum value V4H. A prescribed threshold voltage VTH4 is set between V4L and V4H.

When PWM signal Au1 falls from "H" level to the "L" level and PWM signal Bu1 rises from the "L" level to the "H" level while IGBT Q4 is on, gate drive circuit 37 sets gate drive signal VG4 to the "L" level which is the deactivated level, compares magnitude between collector-emitter voltage V4 of IGBT Q4 and threshold voltage VTH4, determines IGBT Q4 as being set to the off state when V4 exceeds VTH4, and sets gate drive signal VG3 to the "H" level which is the activated level to turn on IGBT Q3.

When PWM signal Au1 rises from "L" level to the "H" level and PWM signal Bu1 falls from the "H" level to the "L" level while IGBT Q3 is on, gate drive circuit 37 sets gate drive signal VG3 to the "L" level which is the deactivated level, compares magnitude between collector-emitter voltage V3 of IGBT Q3 and threshold voltage VTH3, determines IGBT Q3 as being set to the off state when V3 exceeds VTH3, and sets gate drive signal VG4 to the "H" level which is the activated level to turn on IGBT Q4.

Figure 5:
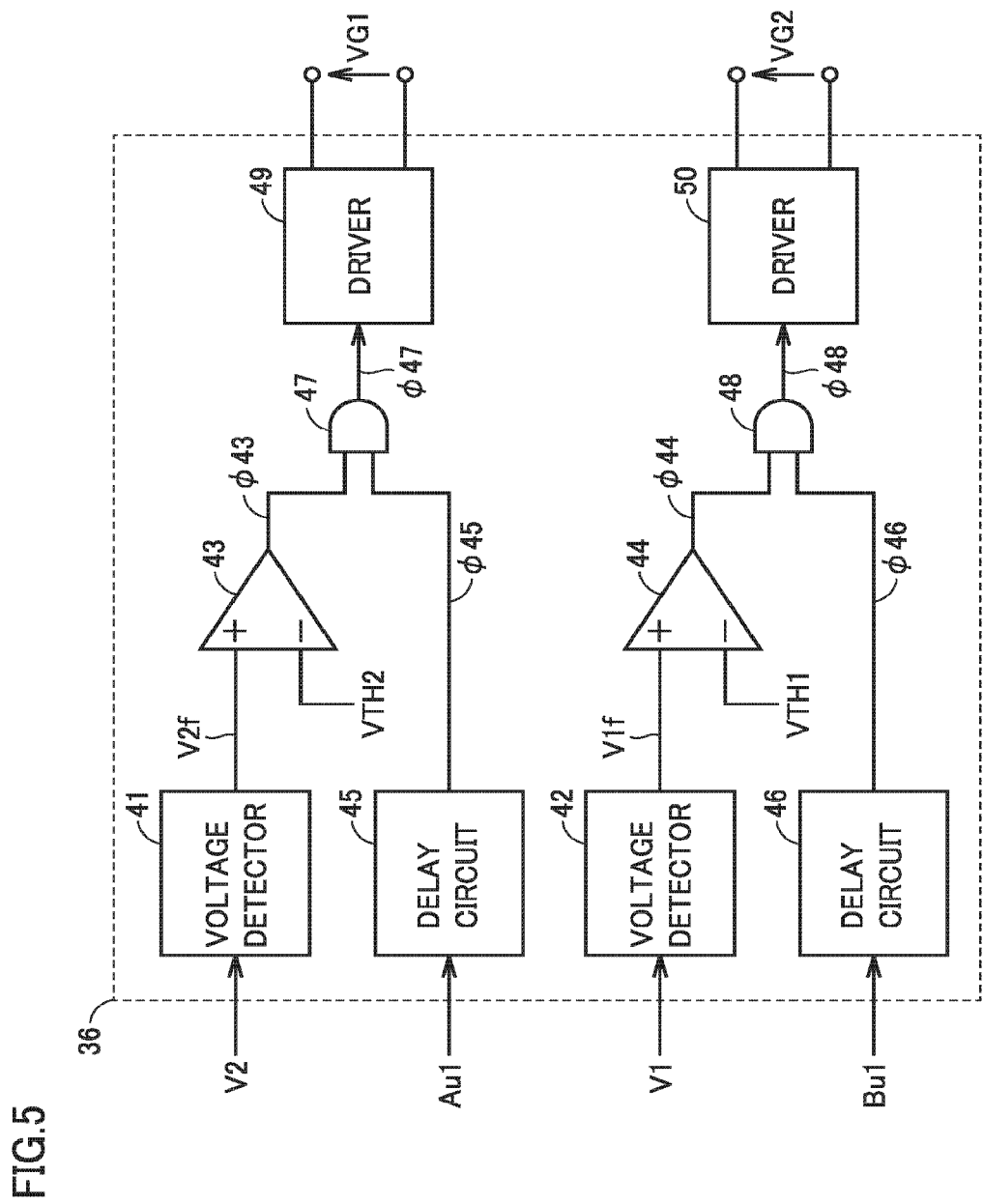
FIG. 5 is a circuit block diagram showing a configuration of a gate drive circuit shown in FIG. 3.

FIG. 5 is a circuit block diagram showing a configuration of gate drive circuit 36. In FIG. 5, gate drive circuit 36 includes voltage detectors 41 and 42, comparators 43 and 44, delay circuits 45 and 46, AND gates 47 and 48, and drivers 49 and 50.

Voltage detector 41 detects collector-emitter voltage V2 of IGBT Q2 and provides a signal V2f indicating a detection value thereof. Voltage detector 42 detects collector-emitter voltage V1 of IGBT Q1 and provides a signal V1f indicating a detection value thereof.

Comparator 43 (a second comparator) compares magnitude between voltage V2 indicated by output signal V2f from voltage detector 41 and threshold voltage VTH2 and provides a signal φ43 indicating a result of comparison. When relation of V2<VTH2 is satisfied, signal φ43 is set to the "L" level, and when relation of V2>VTH2 is satisfied, signal φ43 is set to the "H" level.

Comparator 44 (a first comparator) compares magnitude between voltage V1 indicated by output signal V1f from voltage detector 42 and threshold voltage VTH1 and provides a signal φ44 indicating a result of comparison. When relation of V1<VTH1 is satisfied, signal φ44 is set to the "L" level, and when relation of V1>VTH1 is satisfied, signal φ44 is set to the "H" level.

Threshold voltages VTH1 and VTH2 are set in accordance with characteristics of IGBTs Q1 and Q2, respectively. Threshold voltages VTH1 and VTH2 may be different from or equal to each other.

Delay circuit 45 generates a signal φ45 by delaying only the rising edge of PWM signal Au1 by a prescribed time period Td1. Delay circuit 46 generates a signal φ46 by delaying only the rising edge of PWM signal Bu1 by a prescribed time period Td2. Delay time periods Td1 and Td2 are set in accordance with characteristics of IGBTs Q1 and Q2, respectively. Delay time periods Td1 and Td2 may be different from or equal to each other.

Figure 6:
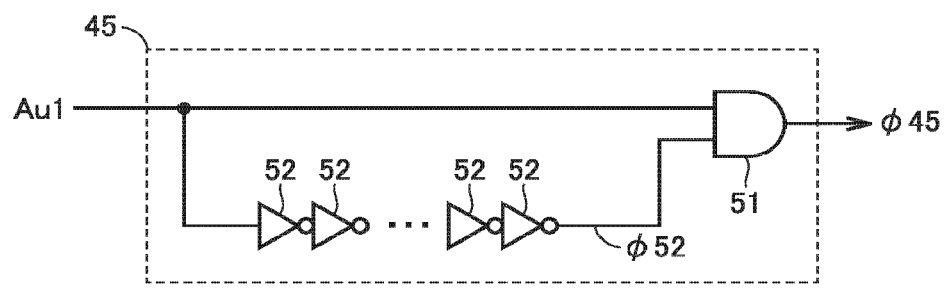
FIG. 6 is a circuit diagram showing a configuration of a delay circuit shown in FIG. 5.

FIG. 6 is a circuit diagram showing a configuration of delay circuit 45. In FIG. 6, delay circuit 45 includes an AND gate 51 and inverters 52 in an even number of stages that are connected in series. PWM signal Au1 is directly provided to one input node of AND gate 51 and provided to the other input node of AND gate 51 through inverters 52 in the even number of stages. An output signal from AND gate 51 is output signal φ45 from delay circuit 45. The number of inverters 52 is set in accordance with delay time period Td1.

When PWM signal Au1 is set to the "H" level, an output signal φ52 from inverter 52 in the last stage is at the "H" level and output signal φ45 from AND gate 51 is at the "H" level. When PWM signal Au1 falls from the "H" level to the "L" level, output signal φ45 from AND gate 51 immediately falls from the "H" level to the "L" level.

When PWM signal Au1 is set to the "L" level, output signal φ52 from inverter 52 in the last stage is at the "L" level and output signal φ45 from AND gate 51 is at the "L" level. When PWM signal Au1 rises from the "L" level to the "H" level, output signal φ52 from inverter 52 in the last stage rises from the "L" level to the "H" level and output signal φ45 from AND gate 51 rises from the "L" level to the "H" level after lapse of delay time period Td1.

Therefore, delay circuit 45 delays only the rising edge of the rising and falling edges of PWM signal Au1 by delay time period Td1. Delay circuit 46 is similar in configuration to delay circuit 45.

Referring back to FIG. 5, AND gate 47 provides a logical AND signal φ47 of output signal φ43 from comparator 43 and output signal φ45 from delay circuit 45. Driver 49 generates gate drive signal VG1 equal in logic level to signal φ47. Gate drive signal VG1 is a voltage signal, and provided between the gate and the emitter of corresponding IGBT Q1.

AND gate 48 provides a logical AND signal φ48 of output signal φ44 from comparator 44 and output signal φ46 from delay circuit 46. Driver 50 generates gate drive signal VG2 equal in logic level to signal φ48. Gate drive signal VG2 is a voltage signal and provided between the gate and the emitter of corresponding IGBT Q2.

Figure 7:
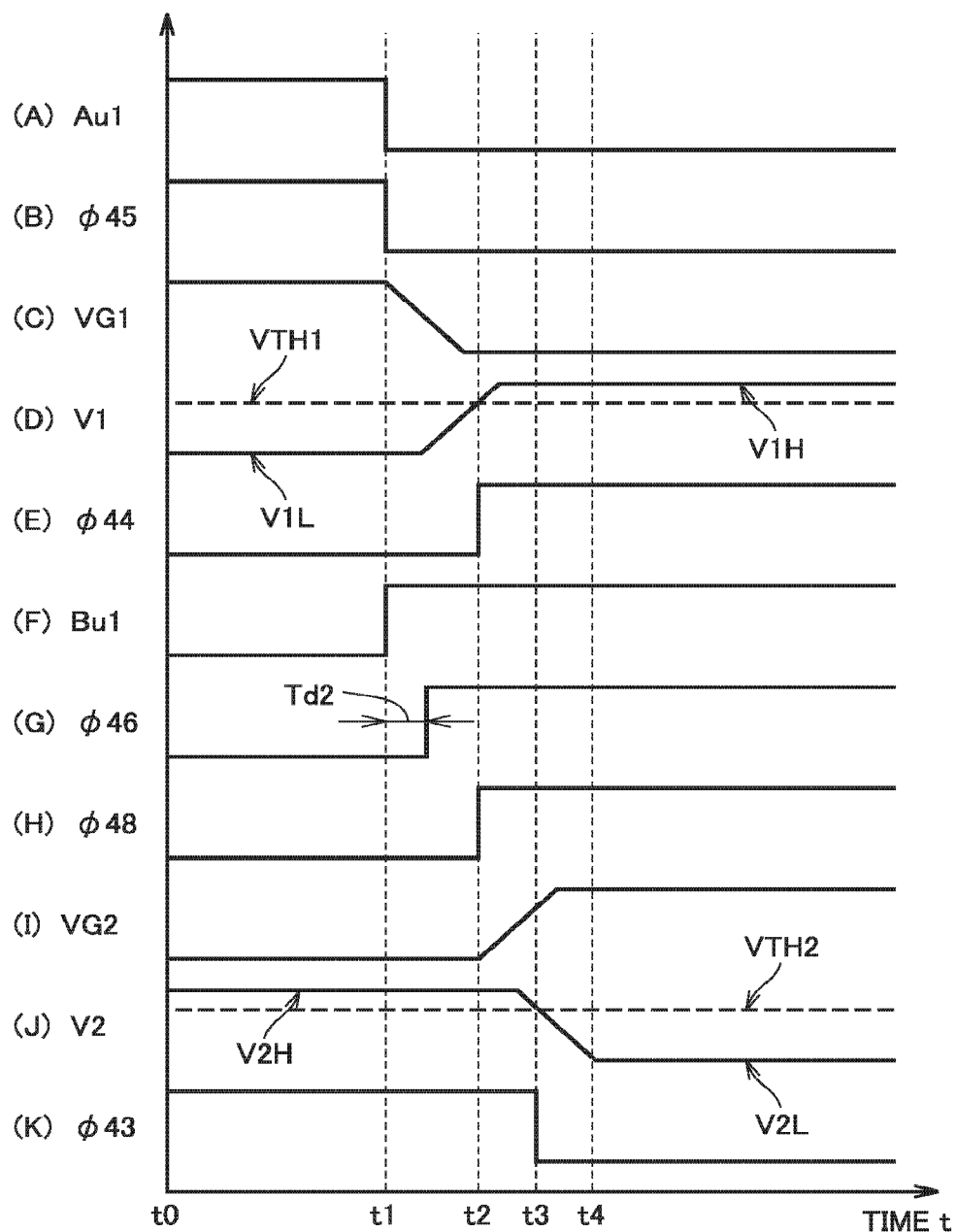
FIG. 7 is a time chart exemplifying an operation by the gate drive circuit shown in FIG. 5.

FIG. 7 is a time chart exemplifying an operation by gate drive circuit 36 shown in FIG. 5. FIG. 7 shows an operation by gate drive circuit 36 when PWM signal Au1 falls from the "H" level to the "L" level.

FIG. 7 (A) shows a waveform of PWM signal Au1, (B) shows a waveform of output signal φ45 from delay circuit 45, (C) shows a waveform of gate drive signal VG1, (D) shows a waveform of collector-emitter voltage V1 of IGBT Q1, and (E) shows a waveform of output signal φ44 from comparator 44.

FIG. 7 (F) shows a waveform of PWM signal Bu1, (G) shows a waveform of output signal φ46 from delay circuit 46, (H) shows a waveform of output signal φ48 from AND gate 48, (I) shows a waveform of gate drive signal VG2, (J)

shows a waveform of collector-emitter voltage V2 of IGBT Q2, and (K) shows a waveform of output signal φ43 from comparator 43.

At time t0, PWM signal Au1 has been set to the "H" level, output signal φ45 from delay circuit 45 is at the "H" level, and gate drive signal VG1 has been set to the "H" level which is the activated level. Therefore, IGBT Q1 is on, collector-emitter voltage V1 of IGBT Q1 has attained to minimum value V1L, and output signal φ44 from comparator 44 is at the "L" level.

PWM signal Bu1 has been set to the "L" level, output signal φ46 from delay circuit 46 has been set the "L" level, output signal φ48 from AND gate 48 is at the "L" level, and gate drive signal VG2 has been set to the "L" level. Therefore, IGBT Q2 is off, collector-emitter voltage V2 of IGBT Q2 has attained to maximum value V2H, and output signal φ43 from comparator 43 is at the "H" level.

When PWM signal Au1 falls to the "L" level at certain time t1, output signal φ45 from delay circuit 45 falls to the "L" level, gate drive signal VG1 lowers toward the "L" level which is the deactivated level, and collector-emitter voltage V1 of IGBT Q1 increases toward maximum value V1H.

When collector-emitter voltage V1 of IGBT Q1 exceeds threshold voltage VTH1 (time t2), output signal φ44 from comparator 44 rises to the "H" level. Threshold voltage VTH1 has been set to a voltage slightly lower than maximum value V1H of V1, and when relation of V1>VTH1 is satisfied, IGBT Q1 is set to the off state.

At time t1, PWM signal Bu1 rises to the "H" level, and output signal φ46 from delay circuit 46 rises to the "H" level after lapse of delay time period Td2 since time t1.

When output signal φ44 from comparator 44 rises to the "H" level at time t2, output signal φ48 from AND gate 48 rises to the "H" level, gate drive signal VG2 increases toward the "H" level, and collector-emitter voltage V2 of IGBT Q2 lowers toward minimum value V2L.

When collector-emitter voltage V2 of IGBT Q2 becomes lower than threshold voltage VTH2 (time t3), output signal φ43 from comparator 43 falls to the "L" level. At time t4, collector-emitter voltage V2 of IGBT Q2 reaches minimum value V2L and IGBT Q2 is set to the on state.

Figure 8:
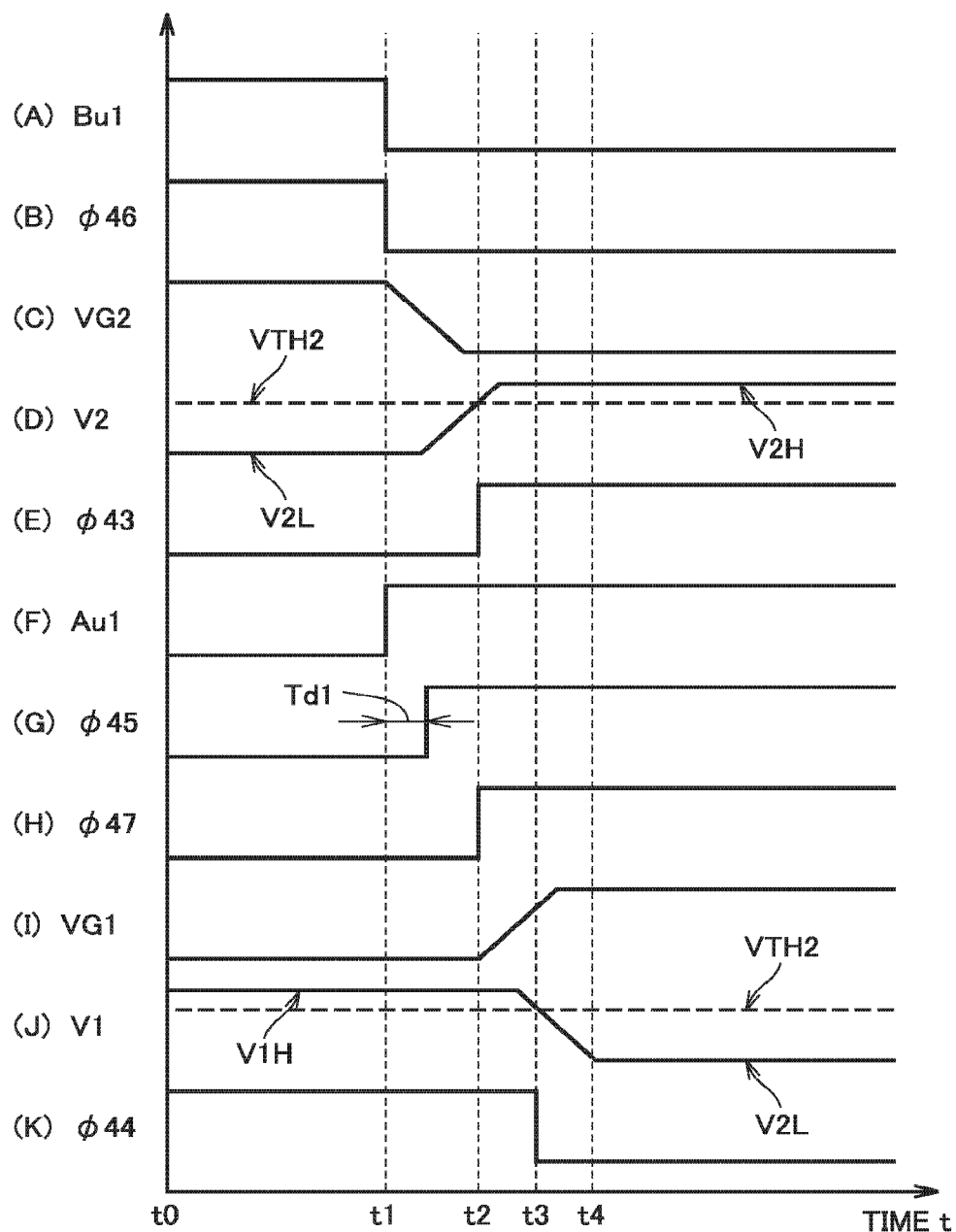
FIG. 8 is another time chart exemplifying an operation by the gate drive circuit shown in FIG. 5.

FIG. 8 is another time chart exemplifying an operation by gate drive circuit 36 shown in FIG. 5. FIG. 8 shows an operation by gate drive circuit 36 when PWM signal Au1 rises from the "L" level to the "H" level.

FIG. 8 (A) shows a waveform of PWM signal Bu1, (B) shows a waveform of output signal φ46 from delay circuit 46, (C) shows a waveform of gate drive signal VG2, (D) shows a waveform of collector-emitter voltage V2 of IGBT Q2, and (E) shows a waveform of output signal φ43 from comparator 43.

FIG. 8 (F) shows a waveform of PWM signal Au1, (G) shows a waveform of output signal φ45 from delay circuit 45, (H) shows a waveform of output signal φ47 from AND gate 47, (I) shows a waveform of gate drive signal VG1, (J) shows a waveform of collector-emitter voltage V1 of IGBT Q1, and (K) shows a waveform of output signal φ44 from comparator 44.

At time t0, PWM signal Bu1 has been set to the "H" level, output signal φ46 from delay circuit 46 is at the "H" level, gate drive signal VG2 has been set to the "H" level which is the activated level, IGBT Q2 is on, collector-emitter voltage V2 of IGBT Q2 has attained to minimum value V2L, and output signal φ43 from comparator 43 has been set to the "L" level.

PWM signal Au1 has been set to the "L" level, output signal φ45 from delay circuit 45 has been set to the "L" level, output signal φ47 from AND gate 47 is at the "L" level, gate drive signal VG1 is at the "L" level, IGBT Q1 is off, collector-emitter voltage V1 of IGBT Q1 has attained to maximum value V1H, and output signal φ44 from comparator 44 is at the "H" level.

At certain time t1, when PWM signal Au1 rises to the "H" level and PWM signal Bu1 falls to the "L" level, output signal φ46 from delay circuit 46 falls to the "L" level, gate drive signal VG2 lowers toward the "L" level which is the deactivated level, and collector-emitter voltage V2 of IGBT Q2 increases toward maximum value V2H.

When collector-emitter voltage V2 of IGBT Q2 exceeds threshold voltage VTH2 (time t2), output signal φ43 from comparator 43 rises to the "H" level. Threshold voltage VTH2 has been set to a voltage slightly lower than maximum value V2H of V2, and when relation of V2>VTH2 is satisfied, IGBT Q2 is set to the off state. Output signal φ45 from delay circuit 45 rises to the "H" level after lapse of delay time period Td1 since rise of PWM signal Au1 to the "H" level.

When output signal φ43 from comparator 43 rises to the "H" level at time t2, output signal φ47 from AND gate 47 rises to the "H" level, gate drive signal VG1 increases toward the "H" level, and collector-emitter voltage V1 of IGBT Q1 lowers toward minimum value V1L. When collector-emitter voltage V1 of IGBT Q1 becomes lower than threshold voltage VTH1 (time t3), output signal φ44 from comparator 44 falls to the "L" level. At time t4, collector-emitter voltage V1 of IGBT Q1 reaches minimum value V1L and IGBT Q1 is set to the on state.

Since gate drive circuit 37 (FIG. 3) is similar in configuration and operations to gate drive circuit 36, description thereof will not be repeated.

Figure 9:
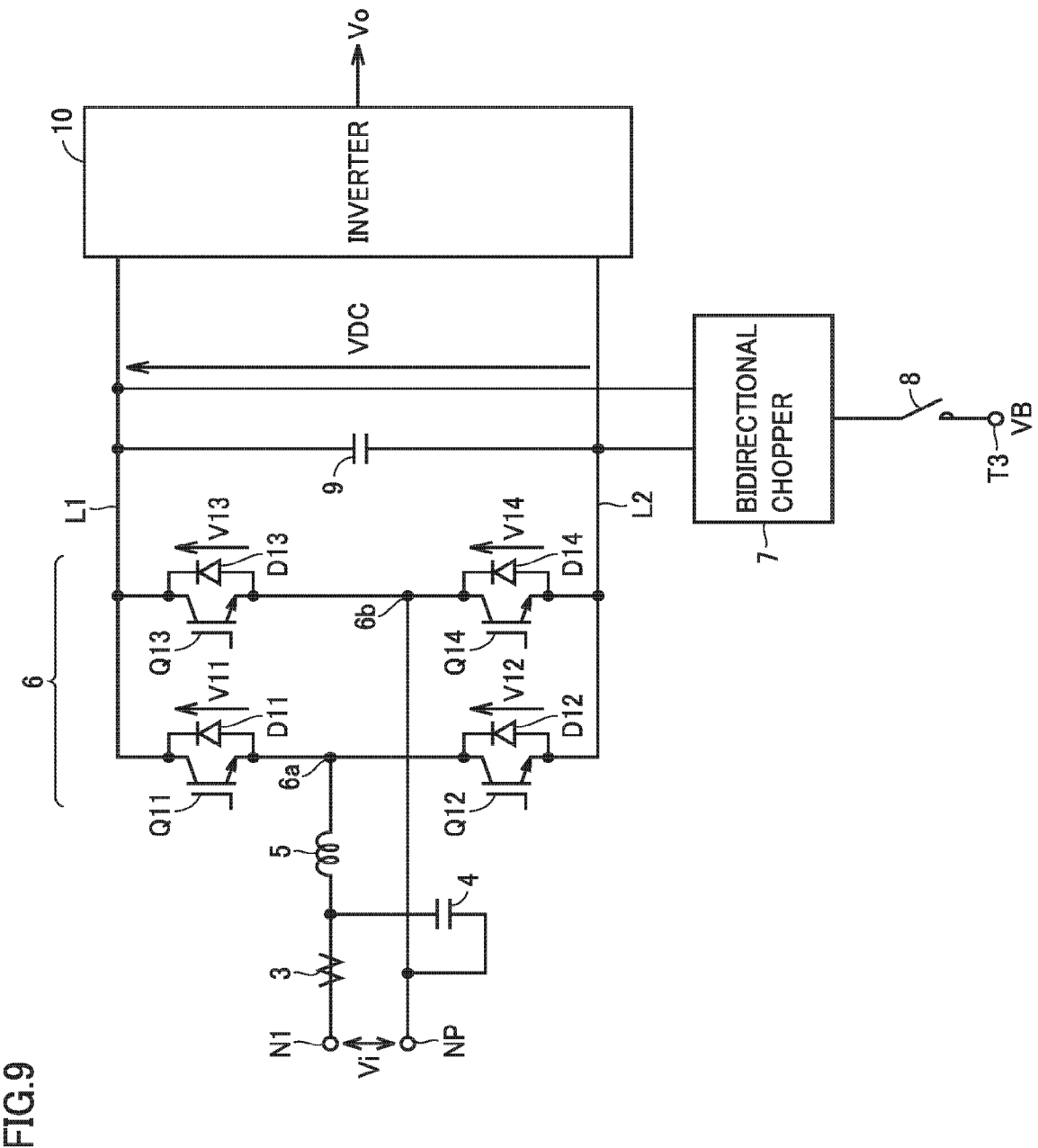
FIG. 9 is a circuit block diagram showing a configuration of a converter shown in FIG. 1 and a peripheral portion thereof.

FIG. 9 is a circuit block diagram showing a configuration of converter 6 shown in FIG. 1 and a peripheral portion thereof and compared with FIG. 2. In FIG. 9, converter 6 includes IGBTs Q11 to Q14 and diodes D11 to D14. IGBTs Q11 and Q12 implement first and second switching elements, respectively. IGBTs Q11 and Q13 have collectors connected to DC line L1 (the first DC terminal) together and have respective emitters connected to input nodes (AC terminals) 6a and 6b.

IGBTs Q12 and Q14 have respective collectors connected to input nodes 6a and 6b and have emitters connected to DC line L2 together. Diodes D11 to D14 are connected in anti-parallel to IGBTs Q11 to Q14, respectively. Converter 6 has input node 6a connected to node N1 with reactor 5 (FIG. 1) being interposed and has input node 6b connected to neutral point NP. Capacitor 4 is connected between node N1 and neutral point NP.

As can be seen in FIGS. 2 and 9, from a point of view of capacitor 9, inverter 10 and converter 6 are identical to each other in configuration. After initial charging of capacitor 9 is completed, converter 6 operates similarly to inverter 10. During initial charging of capacitor 9, operation by inverter 10 is stopped and IGBTs Q11 to Q14 are turned off. AC input voltage Vi supplied from commercial AC power supply 21 (FIG. 1) is subjected to full-wave rectification by diodes D11 to D14, provided between DC lines L1 and L2, and smoothened by capacitor 9 to become DC voltage VDC. A DC power supply that carries out initial charging of capacitor 9 may separately be provided.

As initial charging of capacitor 9 is completed, on/off control of IGBTs Q11 to Q14 is started. In this converter 6, as in inverter 10, IGBTs Q11 and Q14 and IGBTs Q12 and Q13 are alternately turned on.

When IGBTs Q11 and Q14 are turned on and IGBTs Q12 and Q13 are turned off, the positive-side terminal (DC line L1) of capacitor 9 is connected to input node 6a with IGBT Q11 being interposed, input node 6b is connected to the negative-side terminal (DC line L2) of capacitor 9 with IGBT Q14 being interposed, and a voltage across terminals of capacitor 9 is provided between input nodes 6a and 6b. In other words, a positive DC voltage is provided between input nodes 6a and 6b.

When IGBTs Q12 and Q13 are turned on and IGBTs Q11 and Q14 are turned off, the positive-side terminal (DC line L1) of capacitor 9 is connected to input node 6b with IGBT Q13 being interposed, input node 6a is connected to the negative-side terminal (DC line L2) of capacitor 9 with IGBT Q12 being interposed, and a voltage across terminals of capacitor 9 is provided between input nodes 6b and 6a. In other words, a negative DC voltage is provided between input nodes 6a and 6b.

A problem of converter 6 will now be described. As described above, IGBT Q11 and IGBT Q12 are alternately turned on. In switching from a state that IGBT Q11 is on to a state that IGBT Q12 is on, when IGBT Q12 is turned on before IGBT Q11 is set to the off state, an overcurrent flows from the positive-side terminal (DC line L1) of capacitor 9 through IGBTs Q11 and Q12 to the negative-side terminal (DC line L2) of capacitor 9 and IGBTs Q11 and Q12 break.

In contrast, in switching from the state that IGBT Q12 is on to the state that IGBT Q11 is on, when IGBT Q11 is turned on before IGBT Q12 is set to the off state, an overcurrent flows from the positive-side terminal (DC line L1) of capacitor 9 through IGBTs Q11 and Q12 to the negative-side terminal (DC line L2) of capacitor 9 and IGBTs Q11 and Q12 break. IGBTs Q14 and Q13 also suffer from the problem the same as in IGBTs Q11 and Q12. The present first embodiment solves also this problem.

Figure 10:
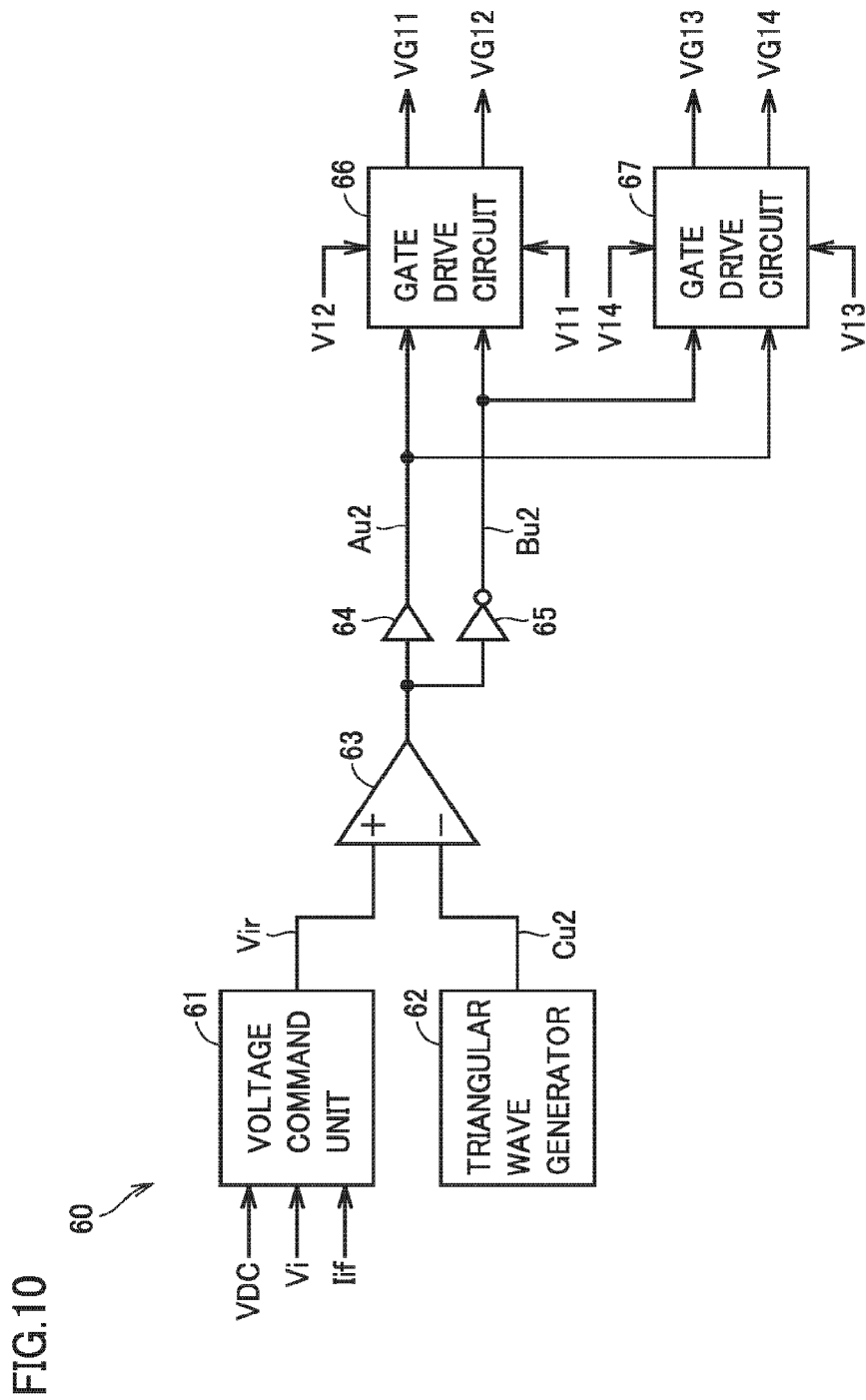
FIG. 10 is a circuit block diagram showing a configuration of a converter controller that controls the converter shown in FIG. 9.

FIG. 10 is a circuit block diagram showing a configuration of a converter controller 60 included in control device 18 shown in FIG. 1. In FIG. 10, converter controller 60 includes a voltage command unit 61, a triangular wave generator 62, a comparator 63, a buffer 64, an inverter 65, and gate drive circuits 66 and 67.

Voltage command unit 61 generates a sinusoidal voltage command value Vir based on voltage VDC across terminals of capacitor 9, an instantaneous value of AC input voltage Vi that appears at node N1 (FIG. 1), and output signal Iif from current detector 3 (FIG. 1).

Specifically, voltage command unit 61 sets a phase difference θ between voltage command value Vir and AC input voltage Vi based on a difference ΔVDC=VDC−VDCr between DC voltage VDC and reference voltage VDCr. When relation of ΔVDC>0 is satisfied, a condition of θ>0 is set. In this case, the AC voltage provided between nodes 6a and 6b of converter 6 is advanced in phase as compared with AC input voltage Vi, electric power is supplied from capacitor 9 to commercial AC power supply 21, and DC voltage VDC lowers.

When relation of ΔVDC<0 is satisfied, a condition of θ<0 is set. In this case, the AC voltage provided between nodes 6a and 6b of converter 6 is delayed in phase as compared with AC input voltage Vi, electric power is supplied from commercial AC power supply 21 to capacitor 9, and DC voltage VDC increases. Therefore, DC voltage VDC is maintained at reference voltage VDCr.

Triangular wave generator 62 provides a triangular wave signal Cu2 at frequency fH (for example, 20 KHz) sufficiently higher than the commercial frequency (for example, 60 Hz). Comparator 63 compares magnitude between voltage command value Vir from voltage command unit 61 and triangular wave signal Cu2 from triangular wave generator 62 and provides a PWM signal Au2 indicating a result of comparison. Buffer 64 provides PWM signal Au2 to gate drive circuit 66. Inverter 65 inverts PWM signal Au2 to generate a PWM signal Bu2 and provides PWM signal Bu2 to gate drive circuit 66.

Waveforms of voltage command value Vir, triangular wave signal Cu2, and PWM signals Au2 and Bu2 are similar to waveforms of voltage command value Vor, triangular wave signal Cu1, and PWM signals Au1 and Bu1 shown in FIG. 4, respectively.

Referring back to FIG. 10, gate drive circuit 66 generates gate drive signals VG11 and VG12 for controlling IGBTs Q11 and Q12 based on PWM signals Au2 and Bu2 and collector-emitter voltages V11 and V12 of IGBTs Q11 and Q12.

When gate drive signal VG11 is set to the "H" level which is the activated level, IGBT Q11 is turned on. When IGBT Q11 is turned on, collector-emitter voltage V11 of IGBT Q11 attains to a minimum value V11L. When gate drive signal VG11 is set to the "L" level which is the deactivated level, IGBT Q11 is turned off. When IGBT Q11 is turned off, collector-emitter voltage V11 of IGBT Q11 attains to a maximum value V11H. A prescribed threshold voltage VTH11 is set between V11L and V11H.

When gate drive signal VG12 is set to the "H" level which is the activated level, IGBT Q12 is turned on. When IGBT Q12 is turned on, collector-emitter voltage V12 of IGBT Q12 attains to a minimum value V12L. When gate drive signal VG12 is set to the "L" level which is the deactivated level, IGBT Q12 is turned off. When IGBT Q12 is turned off, collector-emitter voltage V12 of IGBT Q12 attains to a maximum value V12H. A prescribed threshold voltage VTH12 is set between V12L and V12H.

When PWM signal Au2 falls from the "H" level to the "L" level and PWM signal Bu2 rises from the "L" level to the "H" level while IGBT Q11 is on, gate drive circuit 66 sets gate drive signal VG11 to the "L" level which is the deactivated level, compares magnitude between collector-emitter voltage V11 of IGBT Q11 and threshold voltage VTH11, determines IGBT Q11 as being set to the off state when V11 exceeds VTH11, and sets gate drive signal VG12 to the "H" level which is the activated level to turn on IGBT Q12.

When PWM signal Au2 rises from the "L" level to the "H" level and PWM signal Bu2 falls from the "H" level to the "L" level while IGBT Q12 is on, gate drive circuit 66 sets gate drive signal VG12 to the "L" level which is the deactivated level, compares magnitude between collector-emitter voltage V12 of IGBT Q12 and threshold voltage VTH12, determines IGBT Q12 as being set to the off state when V12 exceeds VTH12, and sets gate drive signal VG11 to the "H" level which is the activated level to turn on IGBT Q11.

Gate drive circuit 67 generates gate drive signals VG13 and VG14 for turning on and off IGBTs Q13 and Q14 based on PWM signals Au2 and Bu2 and collector-emitter voltages V13 and V14 of IGBTs Q13 and Q14.

When gate drive signal VG13 is set to the "H" level which is the activated level, IGBT Q13 is turned on. When IGBT Q13 is turned on, collector-emitter voltage V13 of IGBT Q13 attains to a minimum value V13L. When gate drive signal VG13 is set to the "L" level which is the deactivated level, IGBT Q13 is turned off. When IGBT Q13 is turned off, collector-emitter voltage V13 of IGBT Q13 attains to a maximum value V13H. A prescribed threshold voltage VTH13 is set between V13L and V13H.

When gate drive signal VG14 is set to the "H" level which is the activated level, IGBT Q14 is turned on. When IGBT Q14 is turned on, collector-emitter voltage V14 of IGBT Q14 attains to a minimum value V14L. When gate drive signal VG14 is set to the "L" level which is the deactivated level, IGBT Q14 is turned off. When IGBT Q14 is turned off, collector-emitter voltage V14 of IGBT Q14 attains to a maximum value V14H. A prescribed threshold voltage VTH14 is set between V14L and V14H.

When PWM signal Au2 falls from "H" level to the "L" level and PWM signal Bu2 rises from the "L" level to the "H" level while IGBT Q14 is on, gate drive circuit 67 sets gate drive signal VG14 to the "L" level which is the deactivated level, compares magnitude between collector-emitter voltage V14 of IGBT Q14 and threshold voltage VTH14, determines IGBT Q14 as being set to the off state when V14 exceeds VTH14, and sets gate drive signal VG13 to the "H" level which is the activated level to turn on IGBT Q13.

When PWM signal Au2 rises from "L" level to the "H" level and PWM signal Bu2 falls from the "H" level to the "L" level while IGBT Q13 is on, gate drive circuit 67 sets gate drive signal VG13 to the "L" level which is the deactivated level, compares magnitude between collector-emitter voltage V13 of IGBT Q13 and threshold voltage VTH13, determines IGBT Q13 as being set to the off state when V13 exceeds VTH13, and sets gate drive signal VG14 to the "H" level which is the activated level to turn on IGBT Q14.

Since gate drive circuits 66 and 67 are similar in configuration and operations to gate drive circuit 36 shown in FIGS. 5 to 8, description thereof will not be repeated.

As set forth above, in this first embodiment, in switching from the state that IGBT Q1 is on to the state that IGBT Q2 is on, gate drive signal VG1 is set to the deactivated level and gate drive signal VG2 is set to the activated level in response to voltage V1 across terminals of IGBT Q1 exceeding threshold voltage VTH1. Therefore, since IGBT Q2 is turned on at the time when IGBT Q1 is actually turned off, an overcurrent can be prevented from flowing through IGBTs Q1 and Q2 and efficiency can be improved. This aspect in connection with IGBTs Q1 and Q2 is also applicable to other IGBTs Q3, Q4, and Q11 to Q14.

Figure 11:
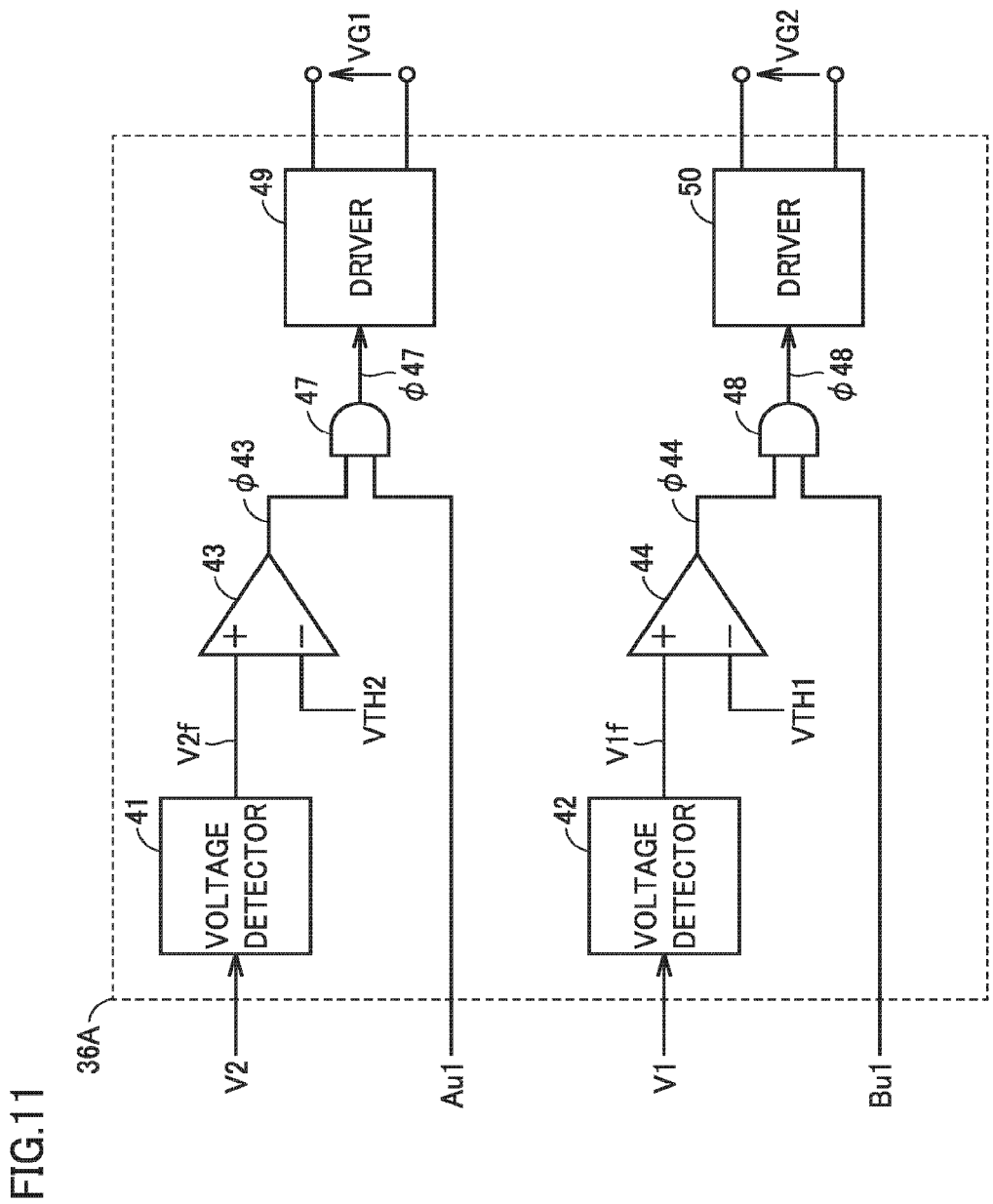
FIG. 11 is a circuit block diagram showing a modification of the first embodiment.

FIG. 11 is a circuit block diagram showing a modification of the first embodiment and compared with FIG. 5. Referring to FIG. 11, in this modification, gate drive circuit 36 is replaced with a gate drive circuit 36A. Gate drive circuit 36A is different from gate drive circuit 36 in that delay circuits 45 and 46 are removed, PWM signal Au1 is directly provided to the other input node of AND gate 47, and PWM signal Bu1 is directly provided to the other input node of AND gate 48. This is equivalent to delay time periods Td1 and Td2 provided by delay circuits 45 and 46 being set to 0 second. Other gate drive circuits 37, 66, and 67 are also modified in configuration similarly to gate drive circuit 36A. This modification also obtains an effect the same as in the first embodiment.

Figure 12:
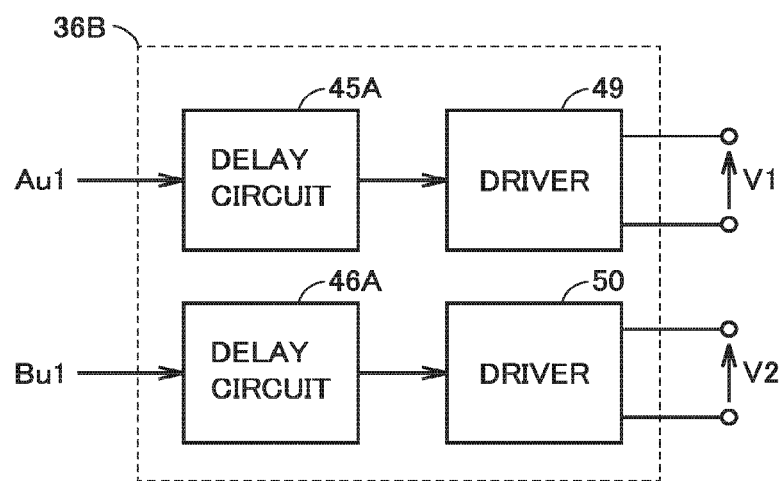
FIG. 12 is a circuit block diagram showing a comparative example of the first embodiment.

FIG. 12 is a circuit block diagram showing a comparative example of the first embodiment and compared with FIG. 5. Referring to FIG. 12, in this comparative example, gate drive circuit 36 is replaced with a gate drive circuit 36B. Gate drive circuit 36B is different from gate drive circuit 36 in that voltage detectors 41 and 42, comparators 43 and 44, and AND gates 47 and 48 are removed and delay circuits 45 and 46 are replaced with delay circuits 45A and 46A.

Delay circuit 45A delays only the rising edge of the rising and falling edges of PWM signal Au1 by a certain deadtime TD1 and provides the PWM signal to driver 49. Delay circuit 46A delays only the rising edge of the rising and falling edges of PWM signal Bu1 by a certain deadtime TD2 and provides the PWM signal to driver 49.

When PWM signal Au1 falls from the "H" level to the "L" level and PWM signal Bu1 rises from the "L" level to the "H" level while IGBTs Q1 and Q2 are in the on state and the off state, respectively, gate drive signal VG1 quickly falls to the "L" level to turn off IGBT Q1 and gate drive signal VG2 rises to the "H" level after lapse of deadtime TD2 to turn on IGBT Q2.

When PWM signal Au1 rises from the "L" level to the "H" level and PWM signal Bu1 falls from the "H" level to the "L" level while IGBTs Q1 and Q2 are in the off state and the on state, respectively, gate drive signal VG2 quickly falls to the "L" level to turn off IGBT Q2 and gate drive signal VG1 rises to the "H" level after lapse of deadtime TD1 to turn on IGBT Q1. Other gate drive circuits 37, 66, and 67 are also modified in configuration similarly to gate drive circuit 36B.

In this comparative example, each of deadtimes TD1 and TD2 is fixed to a constant value. An off delay time period Toff from setting of gate drive signal VG1 to the "L" level until IGBT Q1 is actually set to the off state, however, is varied in inverse proportion to a current (an interrupting current Ioff) that flows through IGBT Q1 while gate drive signal VG1 is at the "H" level.

Figure 13:
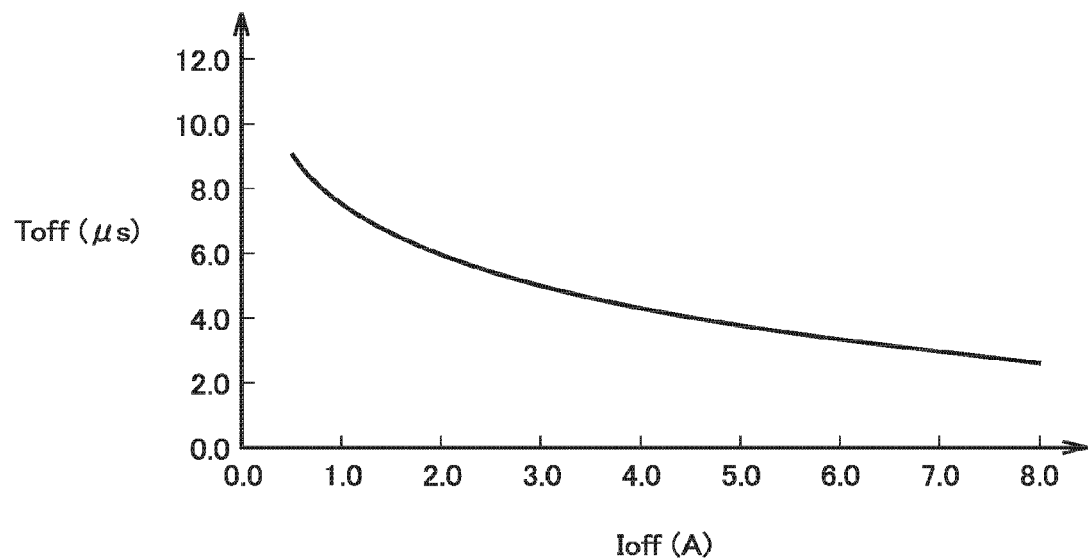
FIG. 13 is a diagram for illustrating a problem in the comparative example shown in FIG. 12.

FIG. 13 is a diagram exemplifying relation between interrupting current Ioff and off delay time period Toff. As shown in FIG. 13, off delay time period Toff attains to a maximum value when interrupting current Ioff is at a smallest value, and off delay time period Toff decreases with increase in interrupting current Ioff.

Therefore, depending on a value of interrupting current Ioff, off delay time period Toff is longer than each of deadtimes TD1 and TD2, and IGBT Q2 (or Q1) may be turned on before IGBT Q1 (or Q2) is turned off and an overcurrent may flow. When deadtime TD1 (or TD2) sufficiently longer than off delay time period Toff is set, on the other hand, a duration of on of IGBT Q1 (or Q2) becomes shorter and efficiency is lowered.

In contrast, in the present first embodiment, in switching from the state that IGBT Q1 is on to the state that IGBT Q2 is on, gate drive signal VG1 is set to the deactivated level and gate drive signal VG2 is set to the activated level in response to voltage V1 across terminals of IGBT Q1 exceeding threshold voltage VTH1. Therefore, since IGBT Q2 is turned on at the time when IGBT Q1 is actually turned off, an overcurrent can be prevented from flowing through IGBTs Q1 and Q2 and efficiency can be improved.

Second Embodiment

Figure 14:
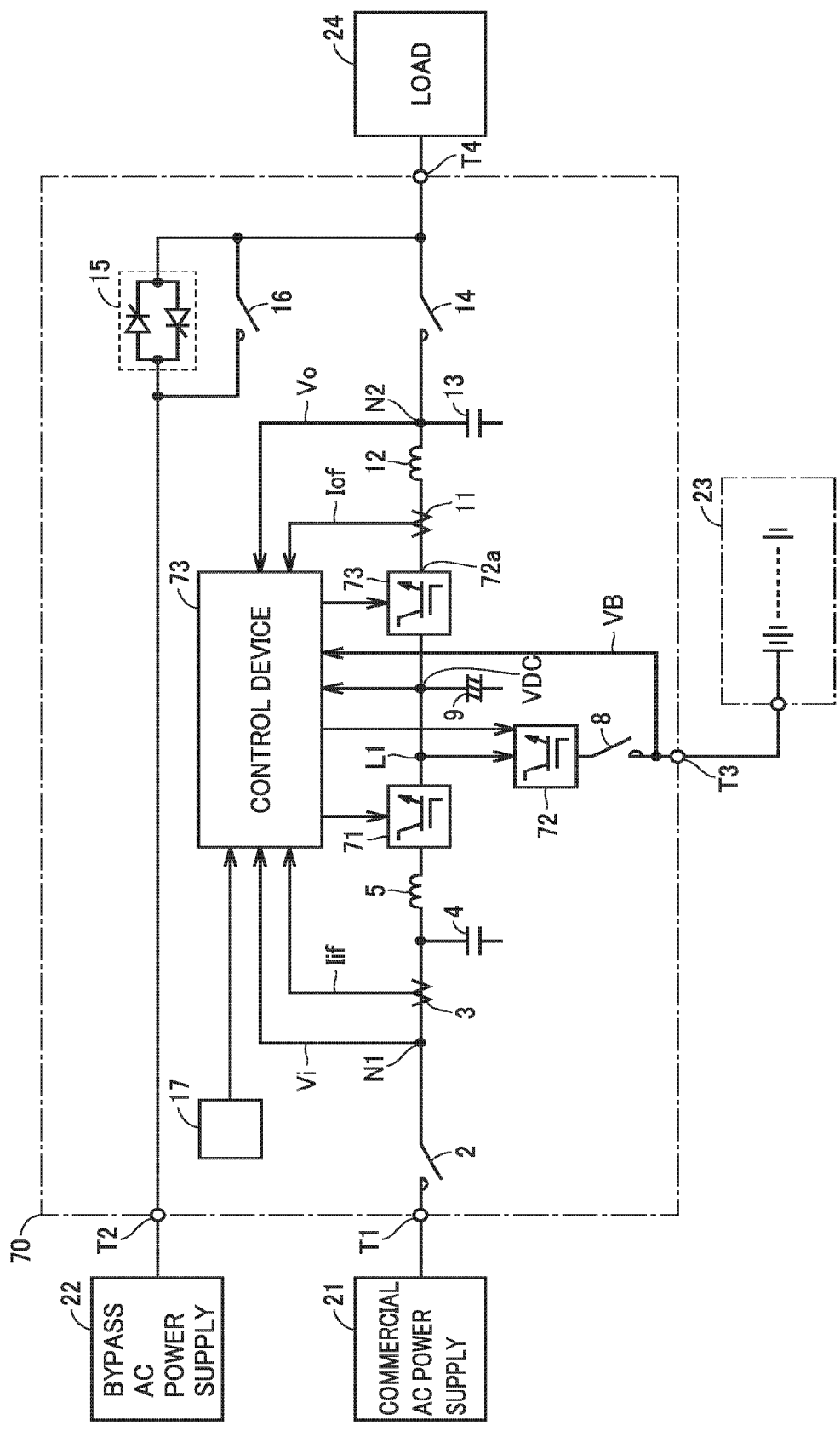
FIG. 14 is a circuit block diagram showing a configuration of an uninterruptible power supply apparatus according to a second embodiment of this invention.

FIG. 14 is a circuit block diagram showing a configuration of an uninterruptible power supply apparatus 70 according to a second embodiment of this invention and compared with FIG. 1. Referring to FIG. 14, uninterruptible power supply apparatus 70 is different from uninterruptible power supply apparatus 1 in the first embodiment in that converter 6, bidirectional chopper 7, inverter 10, and control device 18 are replaced with a converter 71, a bidirectional chopper 72, an inverter 73, and a control device 73, respectively.

Figure 15:
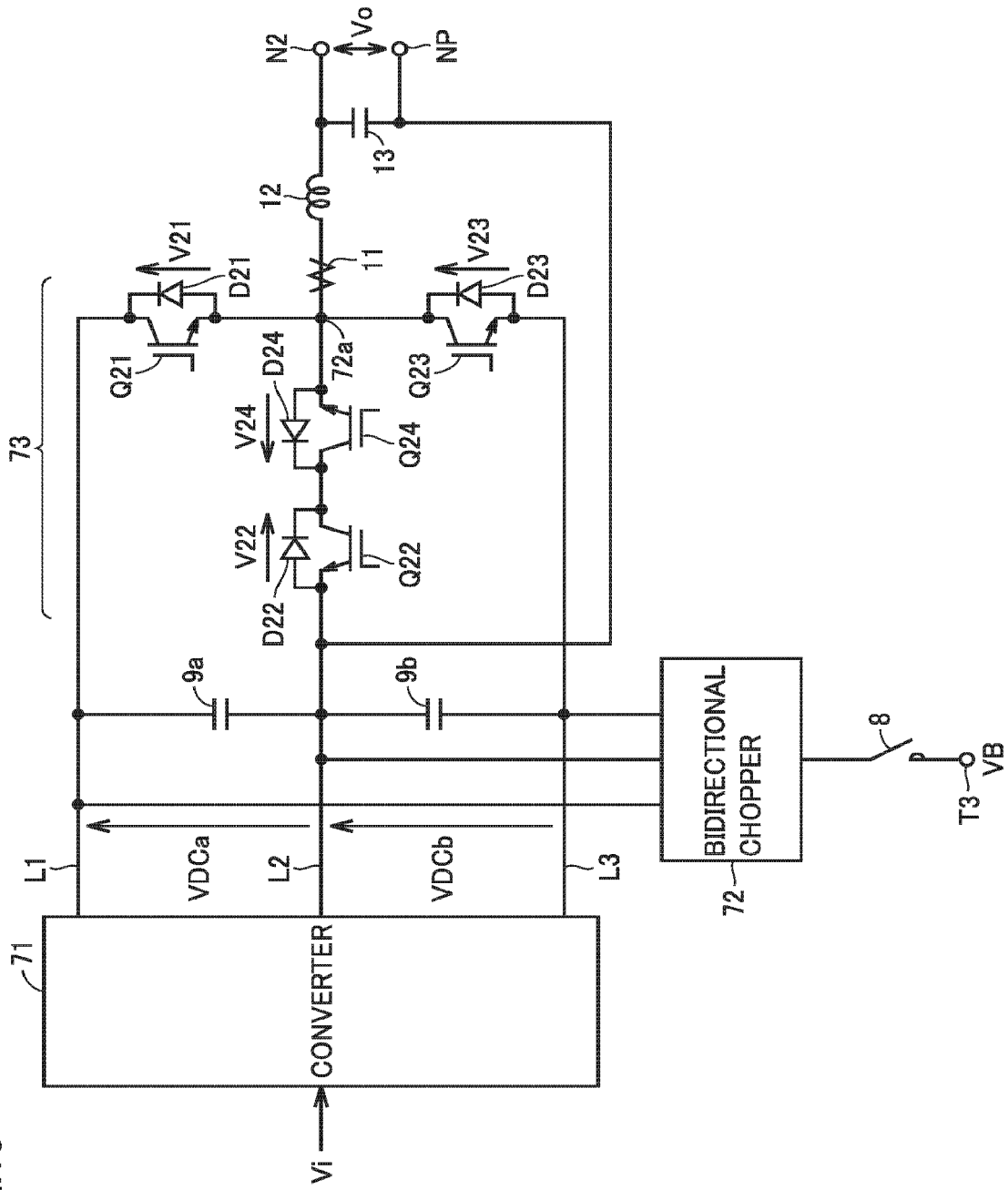
FIG. 15 is a circuit block diagram showing a configuration of an inverter shown in FIG. 14 and a peripheral portion thereof.

FIG. 15 is a circuit block diagram showing inverter 73 and a peripheral portion thereof. In FIG. 15, three DC lines L1 to L3 are connected between converter 71 and inverter 73.

DC line L2 is connected to neutral point NP and set to a neutral point voltage (for example, 0 V). Capacitor 9 includes two capacitors 9a and 9b. Capacitor 9a is connected between DC lines L1 and L2. Capacitor 9b is connected between DC lines L2 and L3.

During the normal operation in which AC power is supplied from commercial AC power supply 21, converter 71 converts AC power from commercial AC power supply 21 to DC power and supplies DC power to DC lines L1 to L3. At this time, converter 71 charges each of capacitors 9a and 9b such that a DC voltage VDCa between DC lines L1 and L2 attains to reference voltage VDCr and a DC voltage VDCb between DC lines L2 and L3 attains to reference voltage VDCr.

Voltages on DC lines L1, L2, and L3 are set to a positive DC voltage (+VDCr), a neutral point voltage (0 V), and a negative DC voltage (−VDCr), respectively. During the power failure in which supply of AC power from commercial AC power supply 21 is suspended, operation by converter 71 is stopped.

During the normal operation, bidirectional chopper 72 has battery 23 store DC power generated by converter 71. Bidirectional chopper 72 at this time charges battery 23 such that voltage VB across terminals of battery 23 attains to reference voltage VBr.

During the power failure, bidirectional chopper 72 has DC power in battery 23 supplied to inverter 73. Bidirectional chopper 72 at this time charges each of capacitors 9a and 9b such that each of voltages VDCa and VDCb across terminals of capacitors 9a and 9b attains to reference voltage VDCr.

During the normal operation, inverter 73 converts DC power generated by converter 71 to AC power at the commercial frequency and supplies AC power to load 24. Inverter 73 at this time generates AC output voltage Vo at the commercial frequency based on the positive DC voltage, the neutral point voltage, and the negative DC voltage supplied from DC lines L1 to L3.

Inverter 73 includes IGBTs Q21 to Q24 and diodes D21 to D24. IGBT Q21 (the first switching element) has the collector connected to DC line L1 (the first DC terminal) and has the emitter connected to an output node 72a (AC terminal). IGBTs Q22 and Q24 (the second and fourth switching elements) have the collectors connected to each other and have respective emitters connected to DC line L2 (the second DC terminal) and output node 72a. IGBT Q23 (the third switching element) has the collector connected to output node 72a and has the emitter connected to DC line L3 (the third DC terminal). Diodes D21 and D24 are connected in anti-parallel to IGBTs Q21 to Q24, respectively. Output node 72a is connected to node N2 with reactor 12 being interposed.

In inverter 73, during the first period, IGBTs Q23 and Q24 are set to the off state and the on state, respectively, and IGBTs Q21 and Q22 are alternately turned on, and during the second period, IGBTs Q21 and Q22 are set to the off state and the on state, respectively, and IGBTs Q23 and Q24 are alternately turned on.

During the first period, when IGBT Q21 is turned on, a positive voltage is provided from DC line L1 through IGBT Q11 to output node 72a. When IGBT Q22 is turned on, output node 72a is connected to DC line L2 with diode D24 and IGBT Q22 being interposed, DC line L2 is connected to output node 72a with diode D22 and IGBT Q24 being interposed, and output node 72a is set to the neutral point voltage. Therefore, during the first period, the positive voltage and the neutral point voltage are alternately provided to output node 72a.

During the second period, when IGBT Q23 is turned on, output node 72a is connected to DC line L2 with IGBT Q23 being interposed and output node 72a is set to a negative voltage. When IGBT Q24 is turned on, DC line L2 is connected to output node 72a with diode D22 and IGBT Q24 being interposed, output node 72a is connected to DC line L2 with diode D24 and IGBT Q22 being interposed, and output node 72a is set to the neutral point voltage. Therefore, during the second period, the negative voltage and the neutral point voltage are alternately provided to output node 72a.

A problem of inverter 73 will now be described. In switching from the state that IGBT Q21 is on to the state that IGBT Q22 is on during the first period, when IGBT Q22 is turned on before IGBT Q21 is set to the off state, an overcurrent flows from the positive-side terminal (DC line L1) of capacitor 9a through IGBT Q21, diode D24, and IGBT Q22 to the negative-side terminal (DC line L2) of capacitor 9a, and IGBT Q21, diode D24, and IGBT Q24 break.

In contrast, in switching from the state that IGBT Q22 is on to the state that IGBT Q21 is on, when IGBT Q21 is turned on before IGBT Q22 is set to the off state, an overcurrent flows from the positive-side terminal (DC line L1) of capacitor 9a through IGBT Q21, diode D24, and IGBT Q22 to the negative-side terminal (DC line L2) of capacitor 9a, and IGBT Q21, diode D24, and IGBT Q22 break. IGBTs Q24 and Q23 also suffer from the problem the same as in IGBTs Q21 and Q22. The present second embodiment solves this problem.

Figure 16:
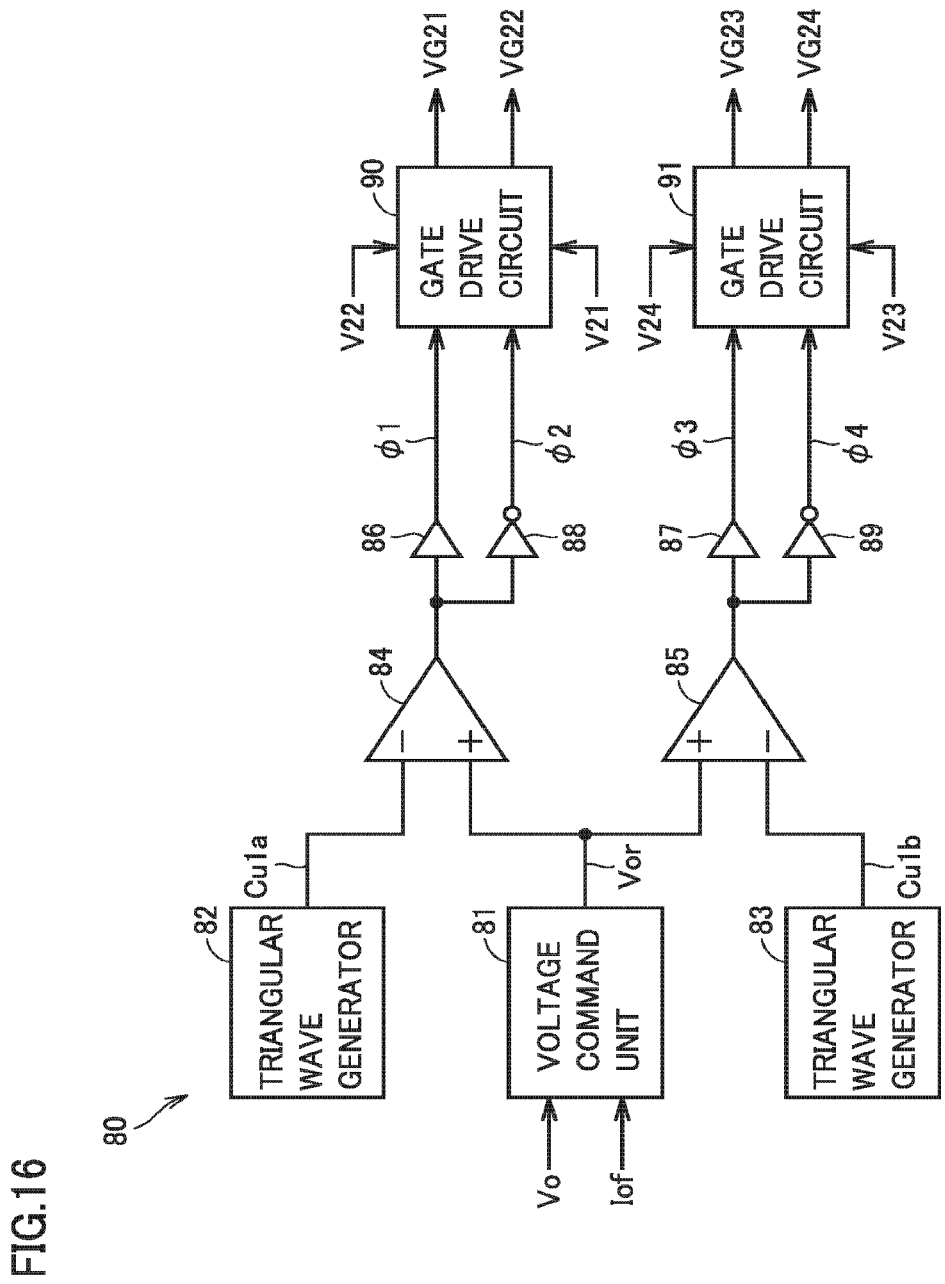
FIG. 16 is a circuit block diagram showing a configuration of an inverter controller that controls the inverter shown in FIG. 15.

FIG. 16 is a circuit block diagram showing a configuration of an inverter controller 80 that controls inverter 73. In FIG. 16, inverter controller 80 includes a voltage command unit 81, triangular wave generators 82 and 83, comparators 84 and 85, buffers 86 and 87, inverters 88 and 89, and gate drive circuits 90 and 91.

Voltage command unit 81 generates sinusoidal voltage command value Vor based on an instantaneous value of AC output voltage Vo that appears at node N2 (FIG. 15) and output signal Iof from current detector 11 (FIG. 15). Voltage command value Vor is in phase with AC input voltage Vi of a corresponding phase (the U phase here) of the three phases (the U phase, the V phase, and the W phase).

Triangular wave generator 82 provides a triangular wave signal Cu1a at frequency fH (for example, 20 KHz) sufficiently higher than the commercial frequency (for example, 60 Hz). Triangular wave generator 83 provides a triangular wave signal Cu1b in phase with triangular wave signal Cu1a and equal in frequency fH thereto.

Comparator 84 compares magnitude between voltage command value Vor from voltage command unit 81 and triangular wave signal Cu1a from triangular wave generator 82 and provides a PWM signal ϕ1 indicating a result of comparison. Buffer 86 provides PWM signal ϕ1 to gate drive circuit 90. Inverter 88 inverts PWM signal ϕ1 to generate a PWM signal ϕ2 and provides PWM signal ϕ2 to gate drive circuit 90.

Comparator 85 compares magnitude between voltage command value Vor from voltage command unit 81 and triangular wave signal Cu1b from triangular wave generator 83 and provides a PWM signal ϕ3 indicating a result of comparison. Buffer 87 provides PWM signal ϕ3 to gate drive circuit 91. Inverter 89 inverts PWM signal ϕ3 to generate a PWM signal ϕ4 and provides PWM signal ϕ4 to gate drive circuit 91.

Figure 17:
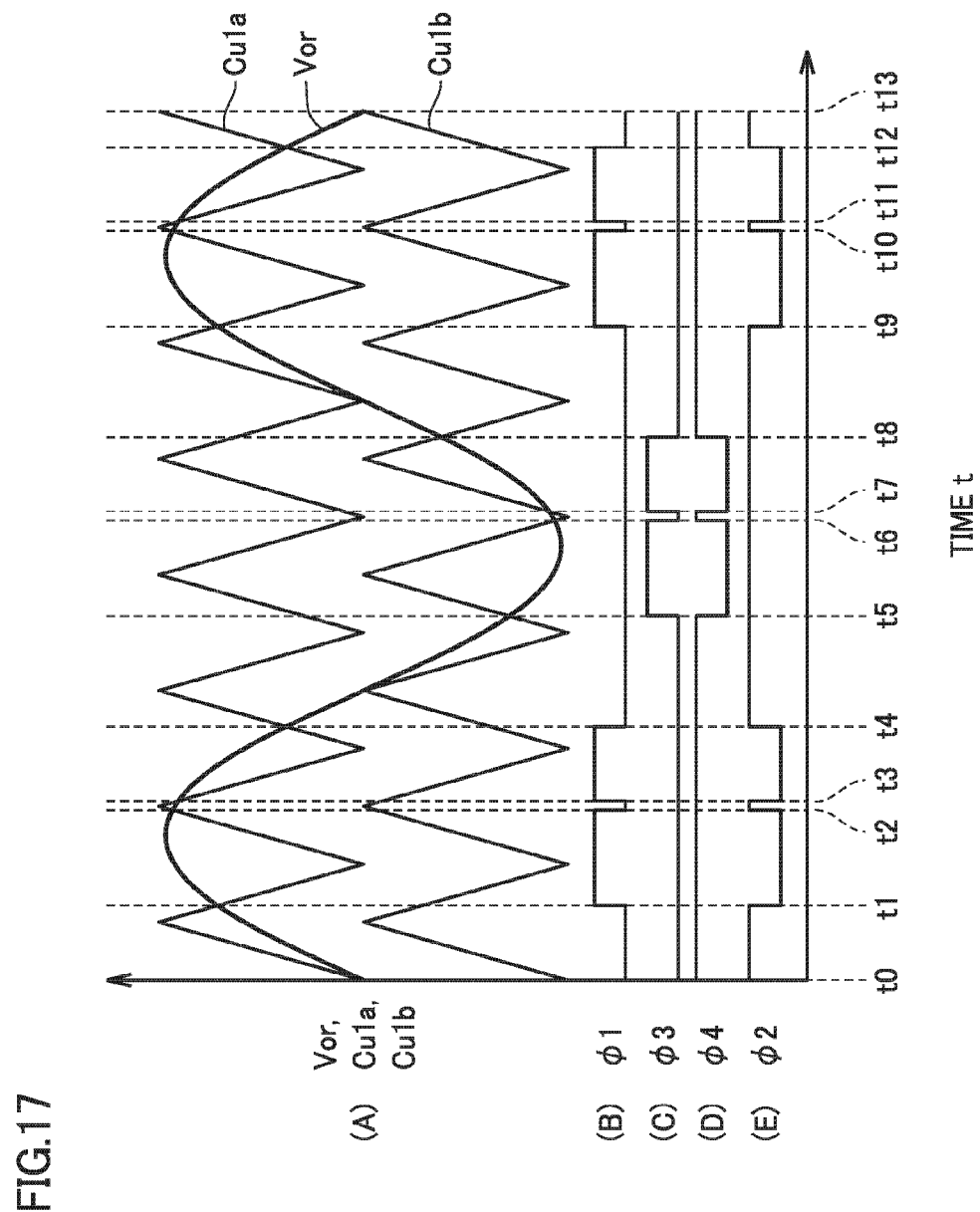
FIG. 17 is a time chart showing waveforms of a voltage command value, a triangular wave signal, and a PWM signal shown in FIG. 16.

FIG. 17 is a time chart showing waveforms of voltage command value Vor, triangular wave signals Cu1a and Cu1$b$, and PWM signals $\phi$1 to $\phi$4 shown in FIG. 16. FIG. 17 (A) shows waveforms of voltage command value Vor and triangular wave signals Cu1$a$ and Cu1$b$ and (B), (C), (D), and (E) show waveforms of PWM signals $\phi$1, $\phi$3, $\phi$4, and $\phi$2, respectively.

As shown in FIG. 17 (A), voltage command value Vor is a sinusoidal signal at the commercial frequency. The minimum value of triangular wave signal Cu1$a$ is 0 V and the maximum value thereof is larger than the positive peak value of voltage command value Vor. The maximum value of triangular wave signal Cu1$b$ is 0 V and the minimum value thereof is smaller than the negative peak value of voltage command value Vor. Triangular wave signals Cu1$a$ and Cu1$b$ are signals in phase and triangular wave signals Cu1$a$ and Cu1$b$ are in phase with voltage command value Vor. The frequency of triangular wave signals Cu1$a$ and Cu1$b$ is higher than the frequency (commercial frequency) of voltage command value Vor.

As shown in FIGS. 17 (A) and (B), when the level of triangular wave signal Cu1$a$ is higher than voltage command value Vor (time t0 to t1, t2 to t3, t4 to t9, ... ), PWM signal $\phi$1 is set to the "L" level. In contrast, when the level of triangular wave signal Cu1$a$ is lower than voltage command value Vor (time t1 to t2, t3 to t4, ... ), PWM signal $\phi$1 is set to the "H" level. PWM signal $\phi$1 becomes a positive pulse signal train.

During the first period for which voltage command value Vor has the positive polarity, a pulse width of PWM signal $\phi$1 increases with increase in voltage command value Vor. During the second period for which voltage command value Vor has the negative polarity, PWM signal $\phi$1 is fixed to the "L" level. As shown in FIGS. 17 (B) and (E), PWM signal $\phi$2 is an inverted signal of PWM signal $\phi$1.

With PWM signals $\phi$1 and $\phi$2 set to the "H" level being defined as the first and second control signals, respectively, the first and second control signals are alternately provided as shown in FIGS. 17 (B) and (E). Voltage command unit 81, triangular wave generator 82, comparator 84, buffer 86, and inverter 88 implement the first control circuit that alternately provides the first and second control signals.

As shown in FIGS. 17 (A) and (C), when the level of triangular wave signal Cu1$b$ is lower than voltage command value Vor (time t0 to t5, t6 to t7, ... ), PWM signal $\phi$3 is set to the "L" level. In contrast, when the level of triangular wave signal Cu1$b$ is higher than voltage command value Vor (time t5 to t6, t7 to t8, ... ), PWM signal $\phi$3 is set to the "H" level. PWM signal $\phi$3 becomes a positive pulse signal train.

During the first period for which voltage command value Vor has the positive polarity, PWM signal $\phi$3 is fixed to the "L" level. During the second period for which voltage command value Vor has the negative polarity, the pulse width of PWM signal $\phi$3 increases with decrease in voltage command value Vor. As shown in FIGS. 17 (C) and (D), PWM signal $\phi$4 is an inverted signal of PWM signal $\phi$3.

With PWM signals $\phi$3 and $\phi$4 set to the "H" level being defined as third and fourth control signals, respectively, as shown in FIGS. 17 (C) and (D), the third and fourth control signals are alternately provided. Voltage command unit 81, triangular wave generator 83, comparator 85, buffer 87, and inverter 89 implement the second control circuit that alternately provides the third and fourth control signals.

As the waveforms of PWM signals $\phi$1 to $\phi$4 are varied as shown in FIG. 17 (B) to (E), AC output voltage Vo the same in waveform as voltage command value Vor shown in FIG. 17 (A) is provided between node N2 and neutral point NP. Though FIG. 17 (A) to (E) show waveforms of voltage command value Vor and signals Cu1$a$, Cu1$b$, and $\phi$1 to $\phi$4 corresponding to the U phase, waveforms of the voltage command value and the signals corresponding to each of the V phase and the W phase are also similar. There is a phase difference by 120 degrees among the voltage command value and the signals corresponding to the U phase, the V phase, and the W phase.

Referring back to FIG. 16, gate drive circuit 90 generates gate drive signals VG21 and VG22 for turning on and off IGBTs Q21 and Q22 based on PWM signals $\phi$1 and $\phi$2 and collector-emitter voltages V21 and V22 of IGBTs Q21 and Q22.

When gate drive signal VG21 is set to the "H" level which is the activated level, IGBT Q21 is turned on. When IGBT Q21 is turned on, collector-emitter voltage V21 of IGBT Q21 attains to a minimum value V21L. When gate drive signal VG21 is set to the "L" level which is the deactivated level, IGBT Q21 is turned off. When IGBT Q21 is turned off, collector-emitter voltage V21 of IGBT Q21 attains to a maximum value V21H. A prescribed threshold voltage VTH21 is set between V21L and V21H.

When gate drive signal VG22 is set to the "H" level which is the activated level, IGBT Q22 is turned on. When IGBT Q22 is turned on, collector-emitter voltage V22 of IGBT Q22 attains to a minimum value V22L. When gate drive signal VG22 is set to the "L" level which is the deactivated level, IGBT Q22 is turned off. When IGBT Q22 is turned off, collector-emitter voltage V22 of IGBT Q22 attains to a maximum value V22H. A prescribed threshold voltage VTH22 is set between V22L and V22H.

When PWM signal $\phi$1 falls from the "H" level to the "L" level and PWM signal $\phi$2 rises from the "L" level to the "H" level while IGBT Q21 is on, gate drive circuit 90 sets gate drive signal VG21 to the "L" level which is the deactivated level, compares magnitude between collector-emitter voltage V21 of IGBT Q21 and threshold voltage VTH21, determines IGBT Q21 as being set to the off state when V21 exceeds VTH21, and sets gate drive signal VG22 to the "H" level which is the activated level to turn on IGBT Q22.

When PWM signal $\phi$1 rises from the "L" level to the "H" level and PWM signal $\phi$2 falls from the "H" level to the "L" level while IGBT Q22 is on, gate drive circuit 90 sets gate drive signal VG22 to the "L" level which is the deactivated level, compares magnitude between collector-emitter voltage V22 of IGBT Q22 and threshold voltage VTH22, determines IGBT Q22 as being set to the off state when V22 exceeds VTH22, and sets gate drive signal VG21 to the "H" level which is the activated level to turn on IGBT Q21.

Gate drive circuit 91 generates gate drive signals VG23 and VG24 for turning on and off IGBTs Q23 and Q24 based on PWM signals $\phi$3 and $\phi$4 and collector-emitter voltages V23 and V24 of IGBTs Q23 and Q24.

When gate drive signal VG23 is set to the "H" level which is the activated level, IGBT Q23 is turned on. When IGBT Q23 is turned on, collector-emitter voltage V23 of IGBT Q23 attains to a minimum value V23L. When gate drive signal VG23 is set to the "L" level which is the deactivated level, IGBT Q23 is turned off. When IGBT Q23 is turned off, collector-emitter voltage V23 of IGBT Q23 attains to a maximum value V23H. A prescribed threshold voltage VTH23 is set between V23L and V23H.

When gate drive signal VG24 is set to the "H" level which is the activated level, IGBT Q24 is turned on. When IGBT Q24 is turned on, collector-emitter voltage V24 of IGBT Q24 attains to a minimum value V24L. When gate drive signal VG24 is set to the "L" level which is the deactivated level, IGBT Q24 is turned off. When IGBT Q24 is turned off, collector-emitter voltage V24 of IGBT Q24 attains to a maximum value V24H. A prescribed threshold voltage VTH24 is set between V24L and V24H.

When PWM signal φ3 falls from the "H" level to the "L" level and PWM signal φ4 rises from the "L" level to the "H" level while IGBT Q23 is on, gate drive circuit 91 sets gate drive signal VG23 to the "L" level which is the deactivated level, compares magnitude between collector-emitter voltage V23 of IGBT Q23 and threshold voltage VTH23, determines IGBT Q23 as being set to the off state when V23 exceeds VTH23, and sets gate drive signal VG24 to the "H" level which is the activated level to turn on IGBT Q24.

When PWM signal φ3 rises from the "L" level to the "H" level and PWM signal φ4 falls from the "H" level to the "L" level while IGBT Q24 is on, gate drive circuit 91 sets gate drive signal VG24 to the "L" level which is the deactivated level, compares magnitude between collector-emitter voltage V24 of IGBT Q24 and threshold voltage VTH24, determines IGBT Q24 as being set to the off state when V24 exceeds VTH24, and sets gate drive signal VG23 to the "H" level which is the activated level to turn on IGBT Q23.

Since the configuration and the operations of gate drive circuits 90 and 91 are similar to the configuration (FIG. 5) and the operations (FIGS. 7 and 8) of gate drive circuit 36, description thereof will not be repeated. As in the first embodiment, from a point of view of capacitors 9a and 9b, converter 71 and inverter 73 are similar in configuration. After initial charging of capacitor 9a is completed, converter 71 operates as the inverter, and a converter controller that controls converter 71 is similar to inverter controller 80 (FIG. 16).

As set forth above, in this second embodiment, in switching from the state that IGBT Q21 is on to the state that IGBT Q22 is on, gate drive signal VG21 is set to the deactivated level and gate drive signal VG22 is set to the activated level in response to voltage V21 across terminals of IGBT Q21 exceeding threshold voltage VTH21. Therefore, since IGBT Q22 is turned on when IGBT Q21 is actually turned off, an overcurrent can be prevented from flowing through IGBTs Q21 and Q22 and efficiency can be improved. This aspect in connection with IGBTs Q21 and Q22 is also applicable to IGBTs Q23 and Q24.

Figure 18:
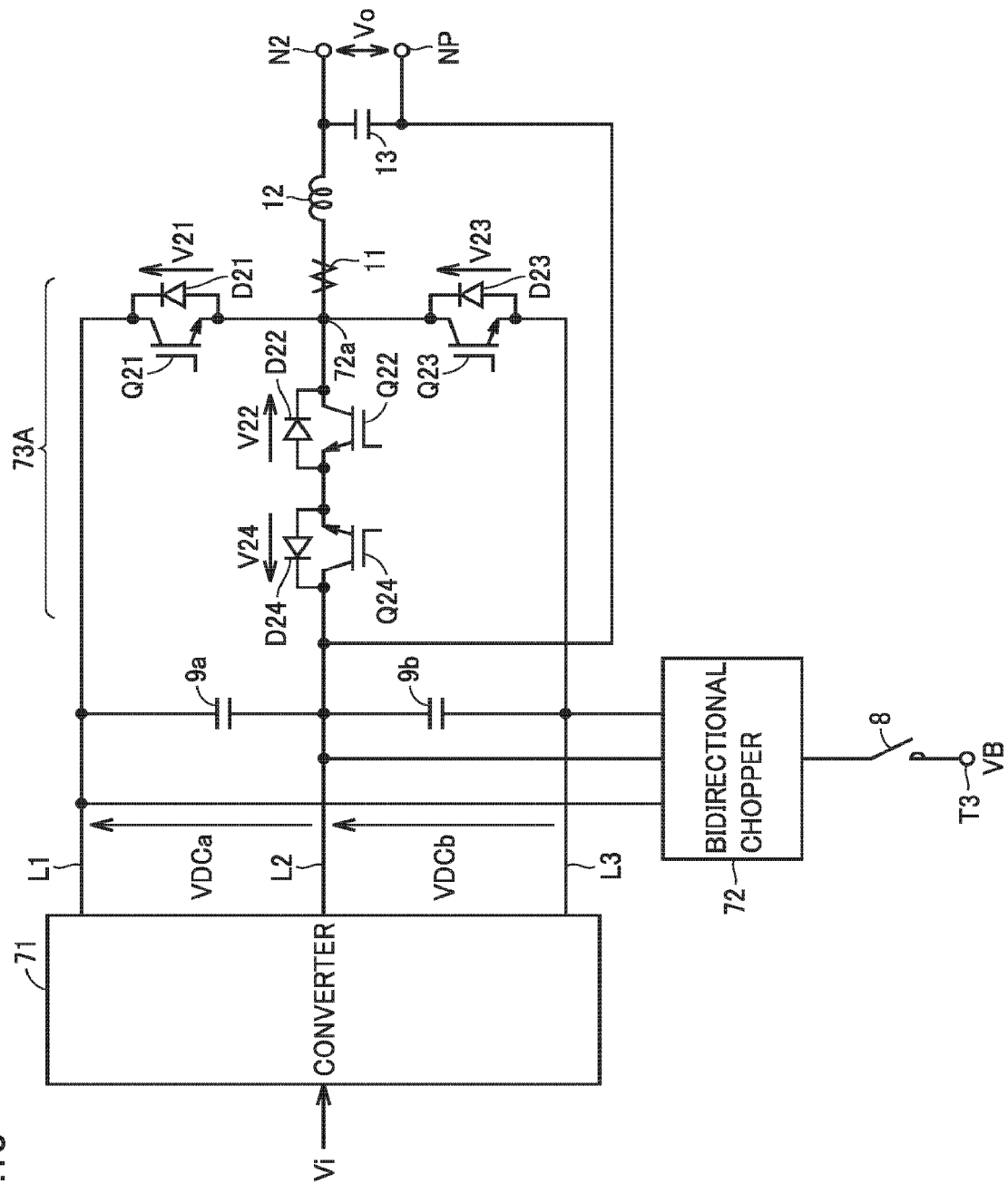
FIG. 18 is a circuit block diagram showing a modification of the second embodiment.

FIG. 18 is a circuit block diagram showing a modification of the second embodiment and compared with FIG. 15. In this modification, inverter 73 in FIG. 15 is replaced with an inverter 73A. Inverter 73A is different from inverter 73 in that connection of IGBT Q22 and IGBT Q24 is reverse. Specifically, IGBTs Q22 and Q24 have the emitters connected to each other and have respective collectors connected to output node 72a and DC line L2. Diodes D22 and D24 are connected in anti-parallel to IGBTs Q22 and Q24, respectively. This modification obtains an effect the same as in the second embodiment.

Third Embodiment

Figure 19:
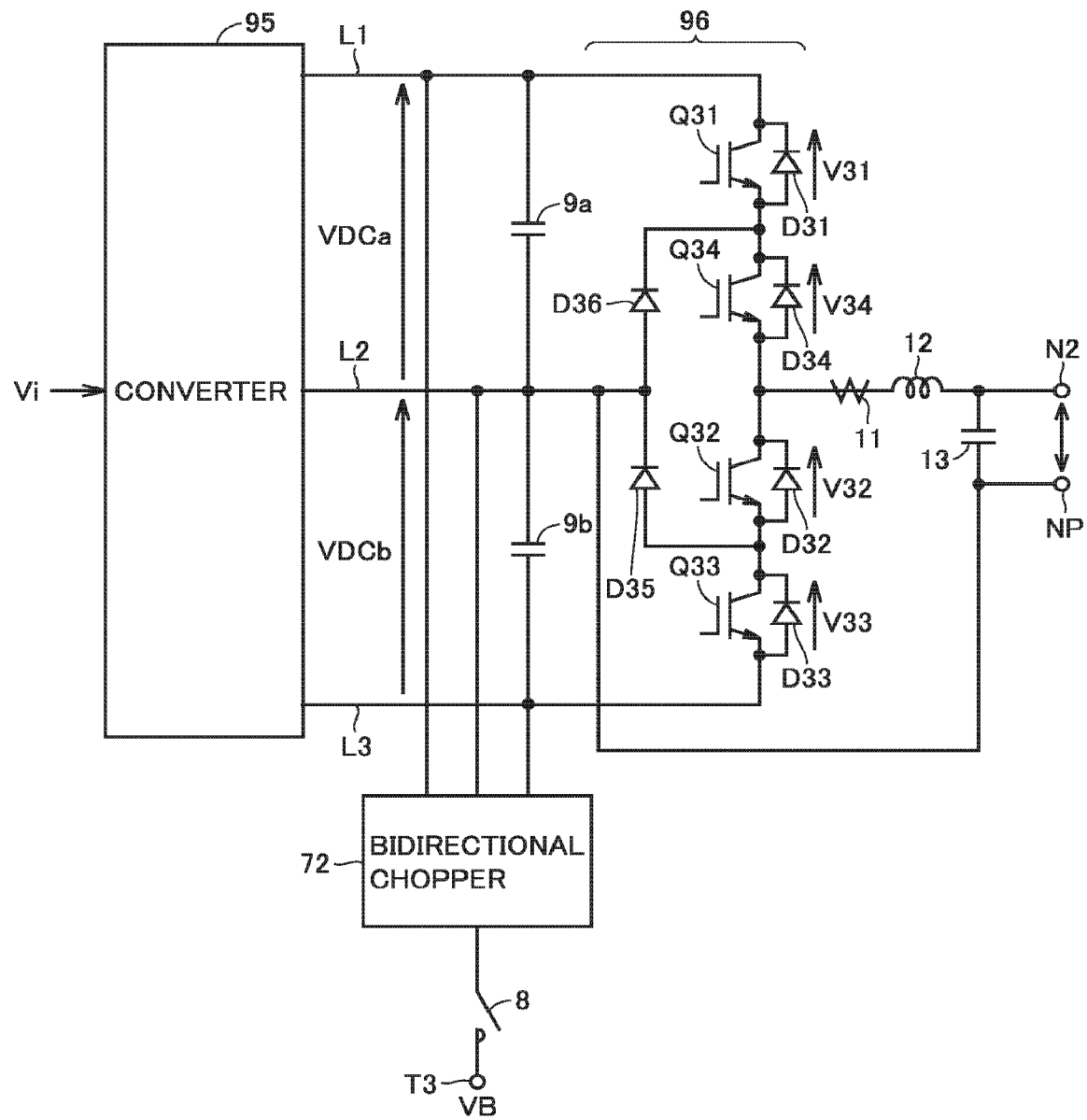
FIG. 19 is a circuit block diagram showing a main portion of an uninterruptible power supply apparatus according to a third embodiment of this invention.

FIG. 19 is a circuit block diagram showing a main portion of an uninterruptible power supply apparatus according to a third embodiment of this invention and compared with FIG. 15. Referring to FIG. 19, this uninterruptible power supply apparatus is different from uninterruptible power supply apparatus 1 in the second embodiment in that converter 71 and inverter 73 are replaced with a converter 95 and an inverter 96, respectively.

In FIG. 19, during the normal operation in which AC power is supplied from commercial AC power supply 21, converter 95 converts AC power from commercial AC power supply 21 to DC power and supplies DC power to DC lines L1 to L3. Converter 95 at this time charges each of capacitors 9a and 9b such that DC voltage VDCa between DC lines L1 and L2 attains to reference voltage VDCr and DC voltage VDCb between DC lines L2 and L3 attains to reference voltage VDCr.

Voltages on DC lines L1, L2, and L3 are set to a positive DC voltage (+VDCr), a neutral point voltage (0 V), and a negative DC voltage (−VDCr), respectively. During the power failure in which supply of AC power from commercial AC power supply 21 is suspended, operation by converter 95 is stopped.

During the normal operation, inverter 96 converts DC power generated by converter 95 to AC power at the commercial frequency and supplies AC power to load 24. Inverter 96 at this time generates AC output voltage Vo at the commercial frequency based on the positive DC voltage, the neutral point voltage, and the negative DC voltage supplied from DC lines L1 to L3.

Inverter 96 includes IGBTs Q31 to Q34 and diodes D31 to D36. IGBT Q31 (the first switching element) has the collector connected to DC line L1 (the first DC terminal) and has the emitter connected to the collector of IGBT Q34 (the fourth switching element), and IGBT Q34 has the emitter connected to an output node 96a (AC terminal). IGBT Q32 (the second switching element) has the collector connected to output node 96a and has the emitter connected to the collector of IGBT Q33 (the third switching element) and IGBT Q33 has the emitter connected to DC line L2.

Diodes D31 to D34 are connected in anti-parallel to IGBTs Q31 to Q34, respectively. Diode D35 (the first diode) has the anode connected to the emitter of IGBT Q32 and has the cathode connected to DC line L2. Diode D36 (the second diode) has the anode connected to DC line L2 and has the cathode connected to the collector of IGBT Q34.

In inverter 96, during the first period, IGBTs Q33 and Q34 are set to the off state and the on state, respectively, and IGBTs Q31 and Q32 are alternately turned on, and during the second period, IGBTs Q31 and Q32 are set to the off state and the on state, respectively, and IGBTs Q33 and Q34 are alternately turned on.

During the first period, as IGBT Q31 is turned on, a positive voltage is provided from DC line L1 through IGBTs Q31 and Q34 to output node 96a. As IGBT Q32 is turned on, output node 96a is connected to DC line L2 with IGBT Q32 and diode D35 being interposed, DC line L2 is connected to output node 96a with diode D36 and IGBT Q34 being interposed, and output node 96a is set to the neutral point voltage. Therefore, during the first period, the positive voltage and the neutral point voltage are alternately provided to output node 96a.

During the second period, as IGBT Q33 is turned on, output node 96a is connected to DC line L3 with IGBTs Q32 and Q33 being interposed and output node 96a is set to the negative voltage. As IGBT Q34 is turned on, DC line L2 is connected to output node 96a with diode D36 and IGBT Q34 being interposed, output node 96a is connected to DC line L2 with IGBT Q32 and diode D35 being interposed, and output node 96a is set to the neutral point voltage. Therefore, during the second period, the negative voltage and the neutral point voltage are alternately provided to output node 96a.

A problem of inverter 96 will now be described. In switching from the state that IGBT Q31 is on to the state that IGBT Q32 is on during the first period, when IGBT Q32 is turned on before IGBT Q31 is turned off, an overcurrent flows from the positive-side terminal (DC line L1) of capacitor 9a through IGBTs Q31, Q34, and Q32 and diode D35 to the negative-side terminal (DC line L2) of capacitor 9a and IGBTs Q31, Q34, and Q32 and diode D35 break.

In contrast, in switching from the state that IGBT Q32 is on to the state that IGBT Q31 is on, when IGBT Q31 is turned on before IGBT Q32 is turned off, an overcurrent flows from the positive-side terminal (DC line L1) of capacitor 9a through IGBTs Q31, Q34, and Q32 and diode D35 to the negative-side terminal (DC line L2) of capacitor 9a, and IGBTs Q31, Q34, and Q32 and diode D35 break. IGBTs Q34 and Q33 also suffer from the problem the same as in IGBTs Q31 and Q32. The present second embodiment solves this problem.

Figure 20:
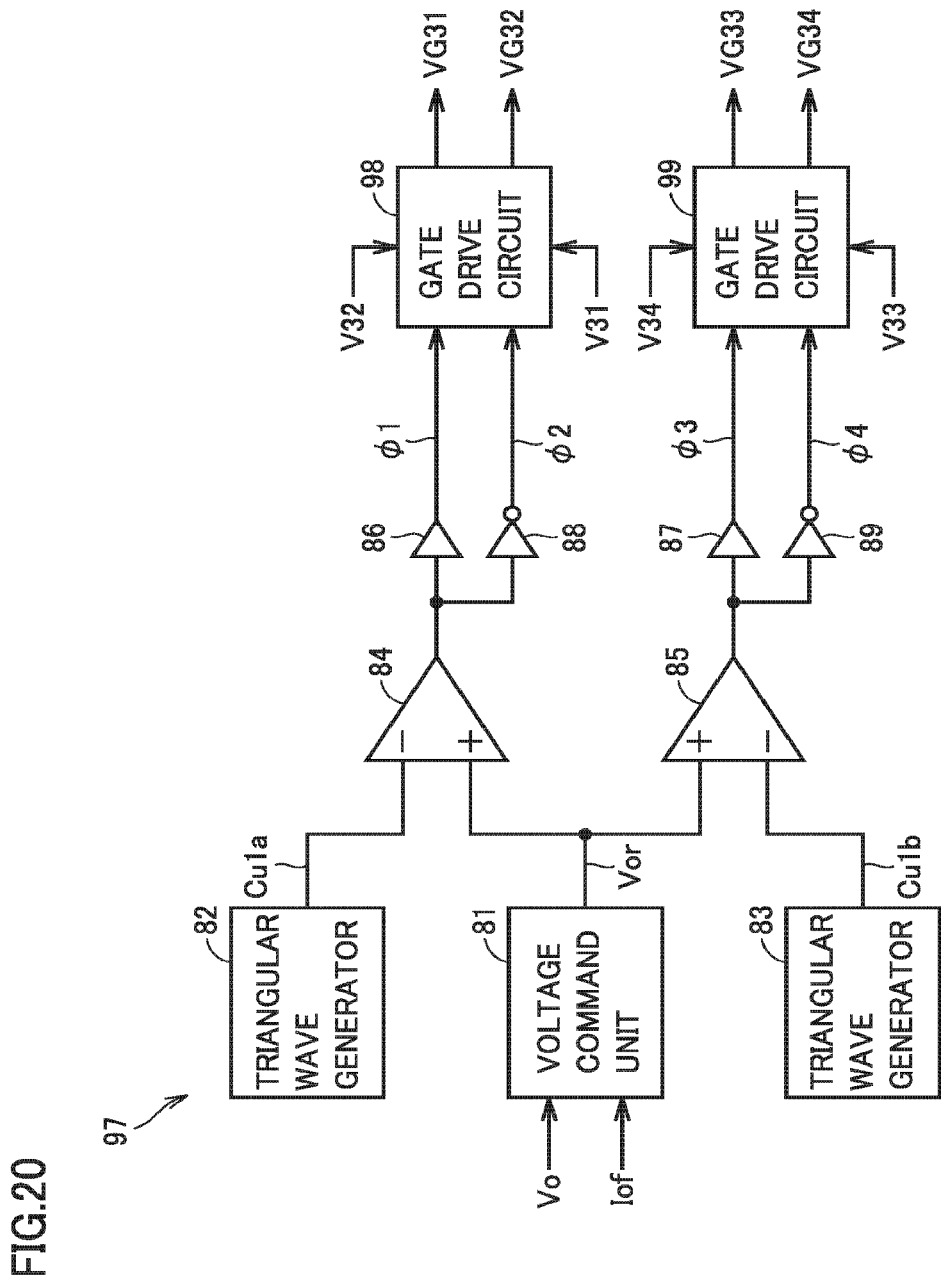
FIG. 20 is a circuit block diagram showing a configuration of an inverter controller that controls an inverter shown in FIG. 19.

FIG. 20 is a circuit block diagram showing a configuration of an inverter controller 97 that controls inverter 96 and compared with FIG. 16. Referring to FIG. 20, inverter controller 97 is different from inverter controller 80 in FIG. 16 in that gate drive circuits 90 and 91 are replaced with gate drive circuits 98 and 99, respectively. Waveforms of voltage command value Vor, triangular wave signals Cu1a and Cu1b, and PWM signals φ1 to φ4 are as shown in FIG. 17.

Gate drive circuit 98 generates gate drive signals VG31 and VG32 for turning on and off IGBTs Q31 and Q32 based on PWM signals φ1 and φ2 and collector-emitter voltages V31 and V32 of IGBTs Q31 and Q32.

When gate drive signal VG31 is set to the "H" level which is the activated level, IGBT Q31 is turned on. When IGBT Q31 is turned on, collector-emitter voltage V31 of IGBT Q31 attains to a minimum value V31L. When gate drive signal VG31 is set to the "L" level which is the deactivated level, IGBT Q31 is turned off. When IGBT Q31 is turned off, collector-emitter voltage V31 of IGBT Q31 attains to a maximum value V31H. A prescribed threshold voltage VTH31 is set between V31L and V31H.

When gate drive signal VG32 is set to the "H" level which is the activated level, IGBT Q32 is turned on. When IGBT Q32 is turned on, collector-emitter voltage V32 of IGBT Q32 attains to a minimum value V32L. When gate drive signal VG32 is set to the "L" level which is the deactivated level, IGBT Q32 is turned off. When IGBT Q32 is turned off, collector-emitter voltage V32 of IGBT Q32 attains to a maximum value V32H. A prescribed threshold voltage VTH32 is set between V32L and V32H.

When PWM signal φ1 falls from the "H" level to the "L" level and PWM signal φ2 rises from the "L" level to the "H" level while IGBT Q31 is on, gate drive circuit 98 sets gate drive signal VG31 to the "L" level which is the deactivated level, compares magnitude between collector-emitter voltage V31 of IGBT Q31 and threshold voltage VTH31, determines IGBT Q31 as being set to the off state when V31 exceeds VTH31, and sets gate drive signal VG32 to the "H" level which is the activated level to turn on IGBT Q32.

When PWM signal φ1 rises from the "L" level to the "H" level and PWM signal φ2 falls from the "H" level to the "L" level while IGBT Q32 is on, gate drive circuit 98 sets gate drive signal VG32 to the "L" level which is the deactivated level, compares magnitude between collector-emitter voltage V32 of IGBT Q32 and threshold voltage VTH32, determines IGBT Q32 as being set to the off state when V32 exceeds VTH32, and sets gate drive signal VG31 to the "H" level which is the activated level to turn on IGBT Q31.

Gate drive circuit 99 generates gate drive signals VG33 and VG34 for turning on and off IGBTs Q33 and Q34 based on PWM signals φ3 and φ4 and collector-emitter voltages V33 and V34 of IGBTs Q33 and Q34.

When gate drive signal VG33 is set to the "H" level which is the activated level, IGBT Q33 is turned on. When IGBT Q33 is turned on, collector-emitter voltage V33 of IGBT Q33 attains to a minimum value V33L. When gate drive signal VG33 is set to the "L" level which is the deactivated level, IGBT Q33 is turned off. When IGBT Q33 is turned off, collector-emitter voltage V33 of IGBT Q33 attains to a maximum value V33H. A prescribed threshold voltage VTH33 is set between V33L and V33H.

When gate drive signal VG34 is set to the "H" level which is the activated level, IGBT Q34 is turned on. When IGBT Q34 is turned on, collector-emitter voltage V34 of IGBT Q34 attains to a minimum value V34L. When gate drive signal VG34 is set to the "L" level which is the deactivated level, IGBT Q34 is turned off. When IGBT Q34 is turned off, collector-emitter voltage V34 of IGBT Q34 attains to a maximum value V34H. A prescribed threshold voltage VTH34 is set between V34L and V34H.

When PWM signal φ3 falls from "H" level to the "L" level and PWM signal φ4 rises from the "L" level to the "H" level while IGBT Q33 is on, gate drive circuit 99 sets gate drive signal VG33 to the "L" level which is the deactivated level, compares magnitude between collector-emitter voltage V33 of IGBT Q33 and threshold voltage VTH33, determines IGBT Q33 as being set to the off state when V33 exceeds VTH33, and sets gate drive signal VG34 to the "H" level which is the activated level to turn on IGBT Q34.

When PWM signal φ3 rises from "L" level to the "H" level and PWM signal φ4 falls from the "H" level to the "L" level while IGBT Q34 is on, gate drive circuit 99 sets gate drive signal VG34 to the "L" level which is the deactivated level, compares magnitude between collector-emitter voltage V34 of IGBT Q34 and threshold voltage VTH34, determines IGBT Q34 as being set to the off state when V34 exceeds VTH34, and sets gate drive signal VG33 to the "H" level which is the activated level to turn on IGBT Q33.

Since the configuration and the operations of gate drive circuits 98 and 99 are similar to the configuration (FIG. 5) and the operations (FIGS. 7 and 8) of gate drive circuit 36, description thereof will not be repeated. As in the first embodiment, from a point of view of capacitors 9a and 9b, converter 95 and inverter 96 are similar in configuration. After initial charging of capacitors 9a and 9b is completed, converter 95 operates as the inverter, and a converter controller that controls converter 95 is similar to inverter controller 97 (FIG. 20).

As set forth above, in this third embodiment, in switching from the state that IGBT Q31 is on to the state that IGBT Q32 is on, gate drive signal VG31 is set to the deactivated level and gate drive signal VG32 is set to the activated level in response to voltage V31 across terminals of IGBT Q31 exceeding threshold voltage VTH31. Therefore, since IGBT Q32 is turned on when IGBT Q31 is actually turned off, an overcurrent can be prevented from flowing through IGBTs Q31 and Q32 and efficiency can be improved. This aspect in connection with IGBTs Q31 and Q32 is also applicable to IGBTs Q33 and Q34.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 1, 70 uninterruptible power supply apparatus; T1 AC input terminal; T2 bypass input terminal; T3 battery terminal; T4 AC output terminal; 2, 8, 14, 16 electromagnetic contactor; 3, 11 current detector; 4, 9, 9a, 9b, 13 capacitor; 5, 12 reactor; 6, 71, 95 converter; 7, 72 bidirectional chopper; 10, 73, 96 inverter; 15 semiconductor switch; 17 operation portion; 18 control device; 21 commercial AC power supply; 22 bypass AC power supply; 23 battery; 24 load; Q1 to Q4, Q11 to Q14, Q21 to Q24, Q31 to Q34 IGBT; D1 to D4, D11 to D14, D21 to D24, D31 to D36 diode; 30, 80, 97 inverter controller; 31, 61, 81 voltage command unit; 32, 62, 82, 83 triangular wave generator; 33, 43, 44, 63, 84, 85 comparator; 34, 64, 86, 87 buffer; 35, 52, 65, 88, 89 inverter; 36, 36A, 36B, 37, 66, 67, 90, 91, 98, 99 gate drive circuit; 41, 42 voltage detector; 45, 45A, 46, 46A delay circuit; 47, 48, 51 AND gate; 49, 50 driver

The invention claimed is:

1. A power conversion apparatus comprising:
a first DC terminal that receives a first DC voltage;
an AC terminal that receives an AC voltage;
a second DC terminal that receives a second DC voltage different from the first DC voltage;
a first switching element connected between the first DC terminal and the AC terminal;
a second switching element connected between the AC terminal and the second DC terminal;
a first control circuit that alternately provides first and second control signals; and
a first drive circuit that generates first and second drive signals in response to an output signal from the first control circuit and alternately turns on the first and second switching elements, wherein
when the first and second drive signals are set to an activated level, the first and second switching elements are turned on, respectively,
when the first and second drive signals are set to a deactivated level, the first and second switching elements are turned off, respectively,
when the first switching element is on, the first drive circuit sets the first drive signal to the deactivated level response to the second control signal and sets the second drive signal to the activated level in response to a voltage across terminals of the first switching element exceeding a first threshold voltage, and
when the second switching element is on, the first drive circuit sets the second drive signal to the deactivated level in response to the first control signal and sets the first drive signal to the activated level in response to a voltage across terminals of the second switching element exceeding a second threshold voltage.

2. The power conversion apparatus according to claim 1, wherein
the first and second switching elements are first and second insulated gate bipolar transistors, respectively, and
the power conversion apparatus further comprises first and second diodes connected in anti-parallel to the first and second insulated gate bipolar transistors, respectively.

3. The power conversion apparatus according to claim 1, wherein
the first control circuit alternately provides the first and second control signals during a first period, and continues output of the second control signal during a second period,
the first drive circuit alternately turns on the first and second switching elements during the first period, and maintains the first and second switching elements in an off state and an on state, respectively, during the second period,
the power conversion apparatus further comprises:
a third DC terminal that receives a third DC voltage different from the second DC voltage;
a third switching element connected between the AC terminal and the third DC terminal;
a fourth switching element connected between one terminal of the second switching element and the AC terminal or between the other terminal of the second switching element and the second DC terminal;
a second control circuit that alternately provides third and fourth control signals during the second period, and continues output of the fourth control signal during the first period; and
a second drive circuit that generates third and fourth drive signals in response to an output signal from the second control circuit, alternately turns on the third and fourth switching elements during the second period, and maintains the third and fourth switching elements in the off state and the on state, respectively, during the first period;
the second DC voltage is a voltage intermediate between the first and third DC voltages,
when the third and fourth drive signals are set to the activated level, the third and fourth switching elements are turned on, respectively,
when the third and fourth drive signals are set to the deactivated level, the third and fourth switching elements are turned off, respectively,
when the third switching element is on, the second drive circuit sets the third drive signal to the deactivated level in response to the fourth control signal and sets the fourth drive signal to the activated level in response to a voltage across terminals of the third switching element exceeding a third threshold voltage, and
when the fourth switching element is on, the second drive circuit sets the fourth drive signal to the deactivated level in response to the third control signal and sets the third drive signal to the activated level in response to a voltage across terminals of the fourth switching element exceeding a fourth threshold voltage.

4. The power conversion apparatus according to claim 3, wherein
the first, second, third; and fourth switching elements are first, second, third, and fourth insulated gate bipolar transistors, respectively, and
the power conversion apparatus further comprises first, second, third, and fourth diodes connected in anti-parallel to the first, second, third, and fourth insulated gate bipolar transistors; respectively.

5. The power conversion apparatus according to claim 1, wherein
the first control circuit alternately provides the first and second control signals during a first period, and continues output of the second control signal during a second period,
the first drive circuit alternately turns on the first and second switching elements during the first period, and maintains the first and second switching elements in an off state and an on state, respectively, during the second period,
the power conversion apparatus further comprises:
a third DC terminal that receives a third DC voltage different from the second DC voltage;
a third switching element connected between one terminal of the second switching element and the third DC terminal;

a first diode connected between one terminal of the second switching element and the second DC terminal;

a fourth switching element connected between one terminal of the first switching element and the AC terminal;

a second diode connected between the second DC terminal and one terminal of the first switching element;

a second control circuit that alternately provides third and fourth control signals during the second period, and continues output of the fourth control signal during the first period; and a second drive circuit that generates third and fourth drive signals in response to an output signal from the second control circuit, alternately turns on the third and fourth switching elements during the second period, and maintains the third and fourth switching elements in the off state and the on state, respectively, during the first period, the second DC voltage is a voltage intermediate between the first and third DC voltages, when the third and fourth drive signals are set to the activated level, the third and fourth switching elements are turned on, respectively, when the third and fourth drive signals are set to the deactivated level, the third and fourth switching elements are turned off, respectively, when the third switching element is on, the second drive circuit sets the third drive signal to the deactivated level in response to the fourth control signal and sets the fourth drive signal to the activated level in response to a voltage across terminals of the third switching element exceeding a third threshold voltage, and when the fourth switching element is on, the second drive circuit sets the fourth drive signal to the deactivated level in response to the third control signal and sets the third drive signal to the activated level in response to a voltage across terminals of the fourth switching element exceeding a fourth threshold voltage.

6. The power conversion apparatus according to claim 5, wherein the first, second, third, and fourth switching elements are first, second, third, and fourth insulated gate bipolar transistors, respectively, and the power conversion apparatus further comprises third, fourth, fifth, and sixth diodes connected in anti-parallel to the first, second, third, and fourth insulated gate bipolar transistors, respectively.

7. The power conversion apparatus according to claim 1, wherein the first drive circuit includes first and second voltage detectors that detect a voltage across terminals of the first switching element and a voltage across terminals of the second switching element, respectively, a first comparator that provides a first signal in response to the voltage across terminals of the first switching element detected by the first voltage detector exceeding the first threshold voltage, a second comparator that provides a second signal in response to the voltage across terminals of the second switching element detected by the second voltage detector exceeding the second threshold voltage, a first driver that sets the first drive signal to the deactivated level when the second control signal is provided from the first control circuit, and sets the first drive signal to the activated level at time of output of the second signal from the second comparator when the first control signal is provided from the first control circuit, and a second driver that sets the second drive signal to the deactivated level when the first control signal is provided from the first control circuit, and sets the second drive signal to the activated level at time of output of the first signal from the first comparator when the second control signal is provided from the first control circuit.

8. The power conversion apparatus according to claim 1, wherein the first and second switching elements implement an inverter that converts DC power to AC power.

9. The power conversion apparatus according to claim 8, further comprising a converter that converts AC power supplied from a commercial AC power supply to DC power, wherein during a normal operation in which AC power is supplied from the commercial AC power supply, DC power generated by the converter is supplied to the inverter and stored in a power storage device, and during a power failure in which supply of AC power from the commercial AC power supply is suspended, DC power in the power storage device is supplied to the inverter.

10. The power conversion apparatus according to claim 1, wherein the first and second switching elements implement a converter that converts AC power to DC power.

11. The power conversion apparatus according to claim 10, further comprising an inverter that converts DC power to AC power, wherein during a normal operation in which AC power is supplied from a commercial AC power supply, DC power generated by the converter is supplied to the inverter and stored in a power storage device, and during a power failure in which supply of AC power from the commercial AC power supply is suspended, DC power in the power storage device is supplied to the inverter.

\* \* \* \* \*